United States Patent [19]
Ueda et al.

[11] Patent Number: 5,843,598
[45] Date of Patent: Dec. 1, 1998

[54] SUBJECT PLATE FOR RECORDING HOLOGRAMS, HOLOGRAMS-MAKING METHOD, AND HOLOGRAM-RECORDED ARTICLE

[75] Inventors: Kenji Ueda; Shigehiko Tahara; Takehiko Anegawa; Akio Morii, all of Tokyo, Japan

[73] Assignee: DAI Nippon Printing Co., Ltd., Tokyo, Japan

[21] Appl. No.: 683,206

[22] Filed: Jul. 18, 1996

[30] Foreign Application Priority Data

| Jul. 18, 1995 | [JP] | Japan | 7-181698 |
| Jul. 18, 1995 | [JP] | Japan | 7-181699 |
| Dec. 20, 1995 | [JP] | Japan | 7-332030 |

[51] Int. Cl.$^6$ .................................................. G03H 1/04
[52] U.S. Cl. ................ 430/602; 430/1; 359/1; 156/275.5; 156/301; 156/303; 156/361; 355/91; 355/103
[58] Field of Search ............. 430/1, 2; 156/361, 156/275.5, 272.8, 297, 300, 301, 302, 303; 359/1, 3; 355/91, 103

[56] References Cited

U.S. PATENT DOCUMENTS

| T861,026 | 4/1969 | Harper et al. | 359/1 |
| 4,209,250 | 6/1980 | James et al. | 355/18 |
| 5,024,909 | 6/1991 | Smothers et al. | 430/1 |
| 5,105,287 | 4/1992 | Moss et al. | 359/3 |
| 5,182,180 | 1/1993 | Gambogi et al. | 430/1 |
| 5,399,403 | 3/1995 | Instance | 156/303 |
| 5,453,338 | 9/1995 | Suga et al. | 430/1 |
| 5,464,690 | 11/1995 | Boswell | 283/86 |
| 5,504,593 | 4/1996 | Hotta et al. | 359/1 |

FOREIGN PATENT DOCUMENTS

| 0106607 | 4/1984 | European Pat. Off. . |
| 0291928 | 11/1988 | European Pat. Off. . |
| 0435510 | 7/1991 | European Pat. Off. . |
| 0726142 | 8/1996 | European Pat. Off. . |
| 63-287984 | 11/1988 | Japan | 430/2 |
| 63-287988 | 11/1988 | Japan | 430/2 |
| 63-287989 | 11/1988 | Japan | 430/2 |
| 5-323857 | 12/1993 | Japan | 430/1 |
| 2271435 | 4/1994 | United Kingdom | 430/1 |

*Primary Examiner*—Martin Angebranndt
*Attorney, Agent, or Firm*—Sughrue, Mion, Zinn, Macpeak & Seas, PLLC

[57] ABSTRACT

The invention provides a hologram-recording subject plate comprising a block and a variety of subjects fixedly contained therein, which ensures easy, stable yet continuous recording of a multiplicity of identical holograms or different holograms reconstructible by illuminating light, , a hologram-making method using the same, and a hologram-recorded article. The subject plate comprises a transparent solid block and a hologram-recording subject contained therein. A photosensitive material film is applied directly onto one surface of the subject plate, and the subject plate is then irradiated with laser light through the photosensitive material film. Such simple operation enables a multiplicity of identical holograms to be recorded in an easy, stable yet continuous manner.

14 Claims, 18 Drawing Sheets

FIG. 7(a)
FIG. 7(b)
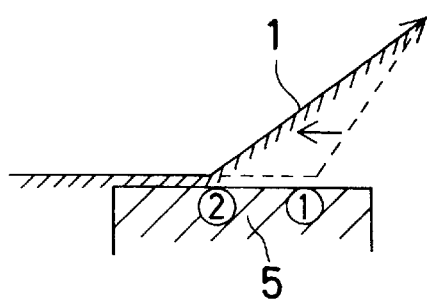
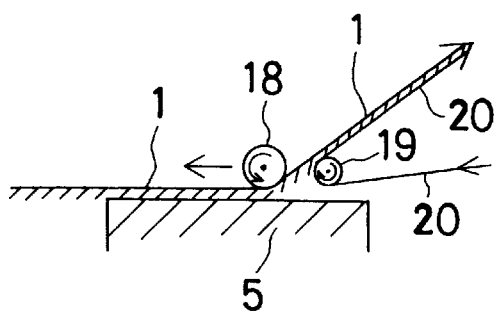
FIG. 8
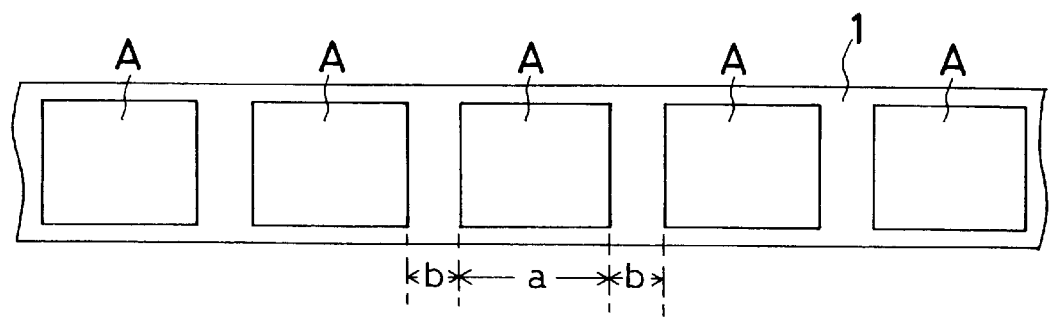
FIG. 9
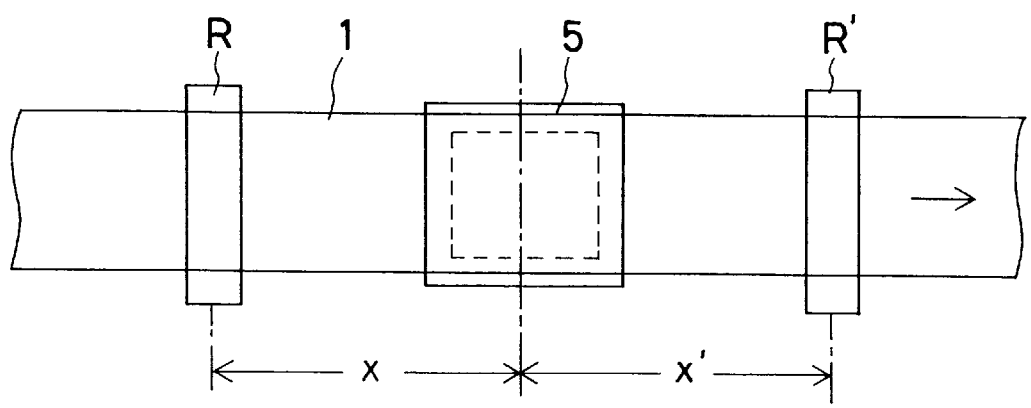

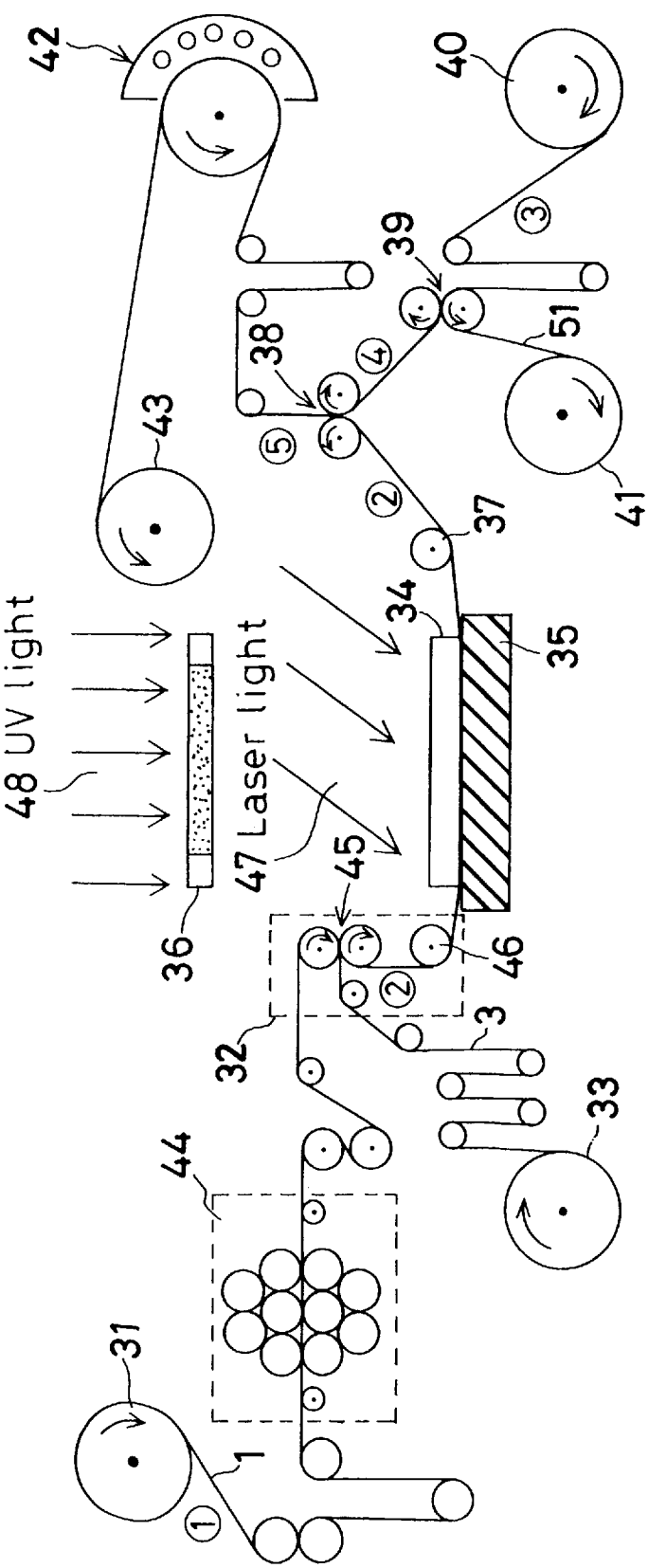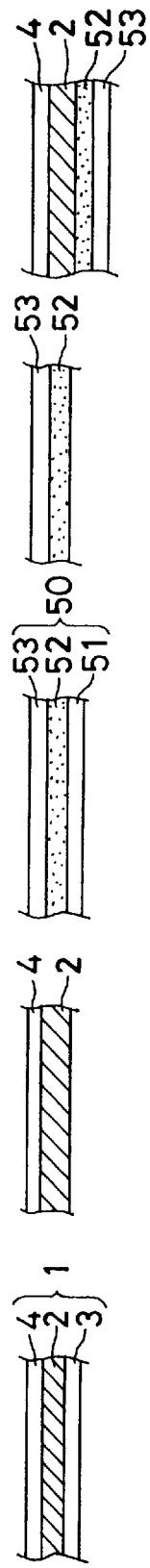

FIG.14(c) TRIMMING, RECORDING, EXPOSURE, ETC.

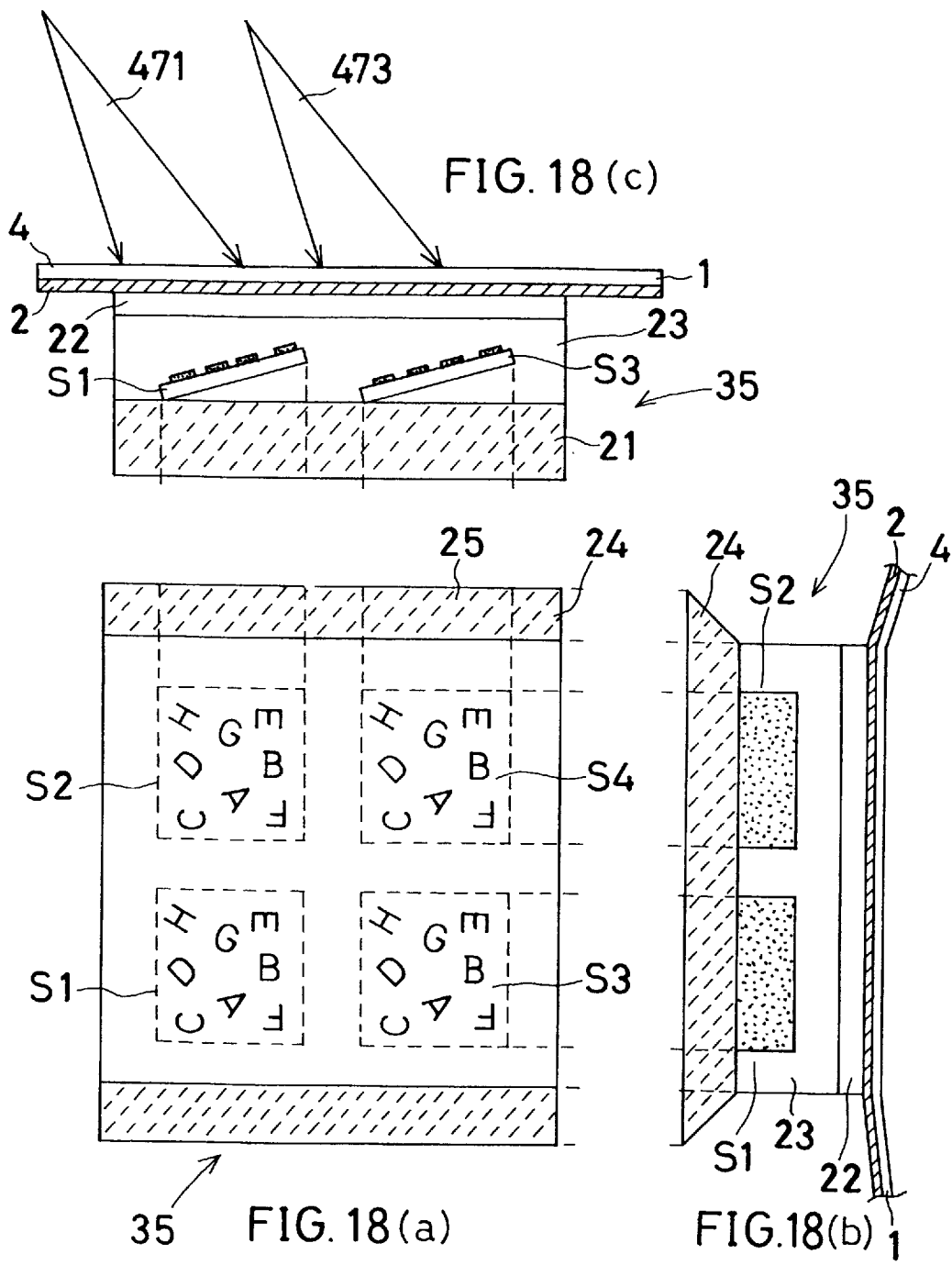

SUBJECT PLATE FOR RECORDING HOLOGRAMS, HOLOGRAMS-MAKING METHOD, AND HOLOGRAM-RECORDED ARTICLE

BACKGROUND OF THE INVENTION

The present invention relates generally to a subject plate for recording holograms by light exposure, a hologram-making method, and a hologram-recorded article. In particular, the present invention is concerned with a subject plate for recording holograms by photography, which enables a multiplicity of holograms to be recorded in a stable manner, a hologram-making method, and a hologram-recorded article.

To record a hologram for each subject by light exposure, it is required that relative positions of the subject, a hologram-recording photosensitive material, and a laser light source be kept in precise alignment. To obtain a multiplicity of identical holograms by light exposure, such awkward, labor-intensive and time-consuming alignment of relative positions must be repeated over and over.

Also available is a method of fabricating one hologram plate which is used to replicate a multiplicity of identical holograms in a continuous manner. With this method, however, it is impossible to replicate a multiplicity of holograms for a variety of subjects other than a previously prepared subject or in different colors.

SUMMARY OF THE INVENTION

In view of the aforesaid problems associated with the prior art, an object of the present invention is to provide a subject plate for recording holograms by light exposure, which can contain a variety of subjects fixed in a block, so that a multiplicity of identical holograms, or different holograms which are reconstructible by exposure to reconstructing light, can be recorded in a simple, stable yet continuous manner, as is the case with a hologram-replicating method.

Another object of the present invention is to provide a hologram-making method using a hologram-recording subject plate comprising a block with a variety of subjects fixedly contained in it to readily, stably and continuously record a multiplicity of identical holograms, or different holograms which are reconstructible by exposure to reconstructing light, and a hologram-recorded article made by such a method.

In order to accomplish the aforesaid objects, the present invention provides a subject plate for recording a hologram characterized by comprising a transparent solid block, in which a subject for recording a hologram is contained.

In this case, the solid block may be integrally provided on a front surface thereof with a transparent protective body, and the subject is integrally provided on a back surface thereof with a colorless transparent body, a colored transparent body or a black absorption body, or any one of a reflecting mirror, a scattering plate, a colored plate or a patterned plate, or a hologram.

As the subject to be contained, use may also be made of a plane or curved mirror.

The present invention also provides a hologram-making method by irradiating a photosensitive material film, which is in close contact with a subject plate for recording a hologram, with light to record the hologram therein, characterized in that said photosensitive material film is comprised of a photosensitive material layer having support film layers located on both sides thereof, one support film layer is released from said photosensitive material film while said photosensitive material film is fed, said photosensitive material film is successively applied onto said subject plate with the thus exposed side of said photosensitive material film located not opposite to said subject plate, while the other side of said photosensitive material film opposite to said subject plate is squeezed by a roller, said photosensitive material film is irradiated with light, and a leading end of said photosensitive material film is successively released from said subject plate while said photosensitive material film is retained by a roller, followed by rolling of said photosensitive material film.

Further, the present invention provides a hologram-making method by irradiating a photosensitive material film, which is in close contact with a subject plate for recording a hologram, with light to record the hologram therein, characterized in that said photosensitive material film is comprised of a photosensitive material layer having support film layers located on both sides thereof, one support film layer is released from said photosensitive material film while said photosensitive film material is fed, said photosensitive film material is successively applied onto said subject plate with the thus exposed side of said photosensitive material film located not opposite to said subject plate, while the other side of said photosensitive material film opposite to said subject plate is squeezed by a roller, said photosensitive material film is irradiated with light, a leading end of said photosensitive material film is successively released from said subject plate while said photosensitive material film is retained by a roller, and a color tuning film is successively applied onto an exposed surface of the thus released photosensitive material film, thereby widening a bandwidth of diffracted wavelength, followed by rolling of said photosensitive material film.

In these methods, the hologram-recording subject plate comprises a transparent solid block, in which a subject for recording a hologram is contained.

In the subject plate, it is desired that the solid block is integrally provided on a front surface thereof with a transparent protective body, and the subject is integrally provided on a back surface thereof with a colorless transparent body, a colored transparent body or a black absorption body, or any one of a reflecting mirror, a scattering plate, a colored plate or a patterned plate, or a combination of two or more thereof, or a hologram.

As the subject use may also be made of a plane or curved mirror.

In either method, the light for irradiating said photosensitive material film may comprise a plurality of light of different wavelengths.

Still further, the present invention provides a hologram-recorded article characterized in that a continuous form of photosensitive material film comprising at least one adhesive or self-adhesive layer and at least one photosensitive material layer and having support film layers on both sides thereof is periodically provided thereon with hologram-recorded areas at a constant inter-frame interval, said hologram-recorded areas being of constant size as viewed in a longitudinal direction of said film.

Preferably in this case, a volume phase type hologram has been recorded in said hologram-recorded areas. At least the hologram-recorded areas have preferably been treated to widen a bandwidth of diffracted wavelength. It is also preferable that one of the support film layers comprise, in order from the photosensitive layer side, a colored or patterned transparent or opaque film, an adhesive or self-adhesive layer, and a releasable cover film.

Still further, the present invention provides a hologram-recorded article characterized by being a laminate comprising, in order from a hologram-viewing side, a protective film, a hologram-recorded layer, a colored or patterned transparent or opaque film, an adhesive or self-adhesive layer, and a releasable cover film, which have been laminated together with or without an adhesive or self-adhesive layer between them.

In this case, the article, from which the cover film has been released, may be applied at the adhesive or self-adhesive layer located thereon onto a printed article.

The hologram-recorded layer may have a wavelength multiplex volume phase type hologram recorded thereon, and has been treated to widen a bandwidth of diffracted wavelength.

Still further, the present invention provides a hologram-recorded article characterized in that it has a wavelength multiplex volume phase type hologram recorded thereon, and has been treated to widen a bandwidth of diffracted wavelength.

With a hologram-recording subject plate comprising a transparent solid block containing a hologram-recording subject according to the present invention, it is possible to record a multiplicity of identical holograms in an easy, stable yet continuous manner. To achieve this, only a photosensitive material film is applied directly onto one surface of the subject plate to irradiate the subject plate through the photosensitive material film with laser light. Even when the incident angle and wavelength of laser light are changed, it is possible to record a variety of holograms with respect to the same subject. By providing the back surface of the subject plate with a reflecting mirror, scattering plate, colored plate or patterned plate as one integral piece, it is possible to record aesthetically and artistically varied holograms, and by providing the back surface of the subject plate integrally with a hologram with a three-dimensional object recorded on it, it is possible to make a hologram producing three-dimensionally superposed 3D images. Furthermore, by using a plane or curved mirror as the subject to be contained in the transparent block, it is possible to record a hologram capable of reconstructing any desired wave fronts or a hologram having any desired image distance or magnification.

With the hologram-making method according to the present invention, it is possible to record a multiplicity of identical holograms in an easy, stable yet continuous manner, because recording can be carried out by bringing a photosensitive material film in close contact with a hologram-recording subject plate and irradiating the subject plate with light through the photosensitive material film. One support film is released from the photosensitive material film, the photosensitive material film is successively applied at its exposed surface onto the subject plate while it is squeezed by rollers, and, upon exposure to light, the photosensitive material film is released at its leading end from the subject plate while it is retained by rollers; so it is possible to make a hologram which is free from air bubbles, and defects upon release, and so is of good quality.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 7(a)–7(b) present schematics for illustrating a film-releasing process based on the present invention.

FIG. 8 is a view showing one exemplary arrangement of hologram-recording areas on film.

FIG. 9 is a view for illustrating one exemplary layout of nip rollers before and after exposure.

FIGS. 12(a)–12(b) presents schematics illustrating one exemplary construction of one embodiment of the hologram-making system according to the present invention.

FIGS. 18(a)–18(c) present three schematics of another hologram-recording subject plate according to the present invention.

DESCRIPTION OF THE PREFERRED EMBODIMENTS

The hologram-recording subject plate, hologram-making method, and hologram-recorded article fabricated according to the present invention will now be explained more specifically with reference to some specific embodiments.

Figure 1C:
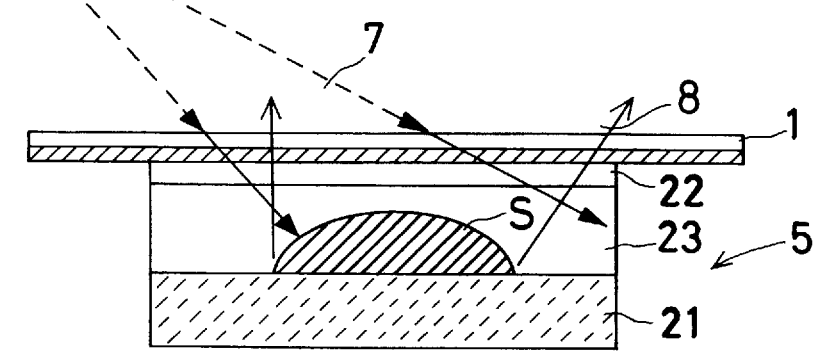
FIGS. 1(a)–1(c) present three schematics showing one exemplary embodiment of the hologram-recording subject plate according to the present invention.
Figure 1A:
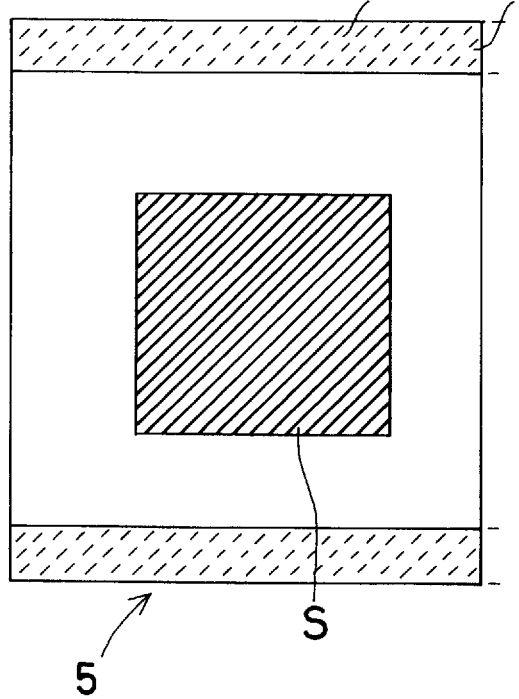
Figure 1B:
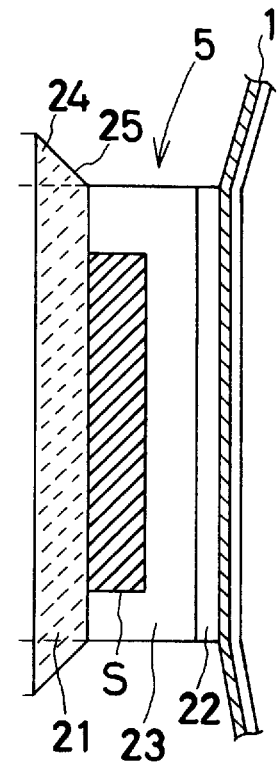

FIG. 1 presents plan, front and side views (a), (b) and (c) of a subject plate for recording holograms according to the present invention, which is shown generally by 5. As illustrated, a three-dimensional subject S is located on a glass substrate 21 in either contact or non-contact relation thereto. In parallel with the glass substrate 21, a protective glass 22 is located on the subject S in either contact or non-contact relation thereto, and a subject-free space between the glass substrate 21 and the protective glass 22 is filled with a transparent filler 23, thereby making a block form of subject plate 5 for recording holograms. It is here to be noted that the block 5 is not limited to a cuboidal form; so it may be in any other desired form which, as typically shown, has a tapered projection 25 so as to fit well in a subject plate holder. It is also to be noted that the protective glass 22 is not necessarily parallel with the glass substrate 21.

The subject S is not limited to an ordinarily used three-dimensional object; so it may be a plane, spherical, aspherical or other reflecting mirror, as will be referred to later. Instead of the glass substrate 21 use may also be made of various members such as relief type holograms, reflecting mirrors, scattering plates, colored plates or patterned plates.

The thickness of the subject plate from the outermost surface of the protective glass 22 to the side of the glass substrate 21 contiguous to the filler 23 is dependent on the coherence length of a light source (usually a laser) for recording holograms using the subject plate 5. More exactly, that thickness should be up to a half of the coherence length of the light source. Too thin a thickness offers a problem in terms of mechanical strength; so 0.1 mm to 1,000 mm, more particularly 1 mm to 30 mm thickness is preferable in this invention. For the recording light source, monochromatic light which has passed through an interference filter may be used provided that it has up to its short coherent length, but it is preferable to use a laser of long coherent length. In particular, it is preferable to use a laser with a wavelength width selected with etalon control. By way of example alone, gas lasers such as helium-neon laser, argon laser, krypton laser and helium-cadmium laser; liquid lasers such as dye laser; and solid lasers such as YAG laser, YAG (2/1) laser, ruby laser and semiconductor laser may be used.

In such an arrangement as shown in FIG. 1, it is preferable to use the glass substrate 21 so as to impart sufficient strength to the subject plate 5, but such a glass substrate may be dispensed with. If the glass substrate 21 is constructed by laminating glass on a metal substrate, it is then possible to increase the strength of the subject plate 5. It is here to be noted that if the glass substrate 21 is black or otherwise colored, light can then be absorbed in the glass substrate 21 so that stray light due to internal reflection of the light at an interface between the glass substrate 21 and air surrounding it can be reduced during recording.

The protective glass 22 is preferably as thin as possible provided that acceptable mechanical strength is ensured. In general, 0.5 mm to 3 mm thickness is available.

Preferably, the filler 23 should be of high transparency, and be reduced in terms of light scattering (or, in another parlance, be of low haze) as well. In view of durability, the filler 23 should also preferably show sufficient adhesion to both the glass substrate 21 and the subject S. Moreover, the filler 23, because of being a material to be contained between the protective glass 22 and the subject S when they are integrally assembled together, should preferably have viscosity enough to fit readily in asperities, with little or no bubbles incorporated therein. When a highly fluid adhesive material is used, special care must be taken to allow the subject plate 5 to keep its block form intact during recording; for instance, an abutment member may be provided to prevent any possible outflow of the filler 23.

The filler 23 has a viscosity of preferably 1 cps to 10,000 cps, more preferably 10 cps to 1,000 cps. The filler 23 must be curable and free from any solvent. If the filler 23 were flowable, it would be substantially impossible to record a multiplicity of effective identical holograms because there would be a variation of position between the subject S and a hologram-recording photosensitive material during the recording of a hologram to be described later. It would also be impossible to remove a solvent from the filler after being incorporated therein. The filler 23, when it is of curable type, is preferably a thermal curable, ionizing radiation curable, two-part mixing curable or hot-melt curable type of filler.

The filler 23 may be made up of rubbery materials such as those based on natural rubber, styrene-butadiene, polyisobutylene, isoprene, natural rubber latex, and styrene-butadiene latex; acrylic materials such as those based on acrylic resin, and acrylic emulsion; silicone materials; and hot-melt materials such as those based on styrene-isoprene block copolymers, styrene-butadiene block copolymers, styrene-ethylene-butylene block copolymers, and ethylene-vinyl acetate copolymers.

For the subject S use may be made of a monochromatic subject, a color subject, and a mirror subject.

1) Monochromatic, and Color Subjects

When a monochromatic subject S is used, color reproducibility is determined depending on the wavelength of the laser used for recording, the reflectance factor of the subject, and the sensitivity of a recording photosensitive material in which a hologram is to be recorded. This is also true of a color subject. However, a subject S having a low reflectance factor is not suitable for hologram recording because the intensity ratio (RO ratio) between reference light and object light becomes poorer. Preferably, the subject used should have a reflectance factor of 3% to 100%, more particularly 20% to 100% for each wavelength. For color recording in particular, interrelations among the light source used, the subject's reflectance factor and the sensitivity of the hologram recording photosensitive material are important, as described specifically below. Here consider the multi-recording of a subject S comprising the three colors, red, green and blue using three lasers of wavelengths 647 nm, 532 nm and 477 nm. The subject S is assumed to have the following reflectance factor for each wavelength.

|             | 647 nm | 532 nm | 477 nm |
| ----------- | ------ | ------ | ------ |
| Red portion | 40%    | 4%     | 4%     |
| Green portion | 10%  | 20%    | 4%     |
| Blue portion | 4%    | 4%     | 20%    |

When the recording light is the 647 nm laser, the red, green and blue portions have reflectance factors of 40%, 10% and 4%, respectively. It is thus likely that in addition to the desired red portion, the green and blue portions are recorded although the RO ratio is poor. This is because crosstalks occur across all the regions, causing some considerable deterioration of color reproducibility. Thus, it is ideally desired that the subject have a reflectance factor of 0% for all but the recording laser wavelength. Since there is practically a certain threshold value, however, it is permissible that the subject has a reflectance factor below that threshold value. In this connection, the most preferable RO ratio is 1:1. Set out below are ideal values of the reflectance factor that the color subject has.

|             | 647 nm | 532 nm | 477 nm |
| ----------- | ------ | ------ | ------ |
| Red portion | 100%   | 0%     | 0%     |
| Green portion | 0%   | 100%   | 0%     |
| Blue portion | 0%    | 0%     | 100%   |

On the contrary, it is also possible to control the color of the hologram to be recorded by making use of the reflectance factor of the subject. Moreover, it is possible to control the diffraction efficiency of each color by a choice of the recording laser, thereby fabricating a full-color hologram having natural tints.

Figure 19:
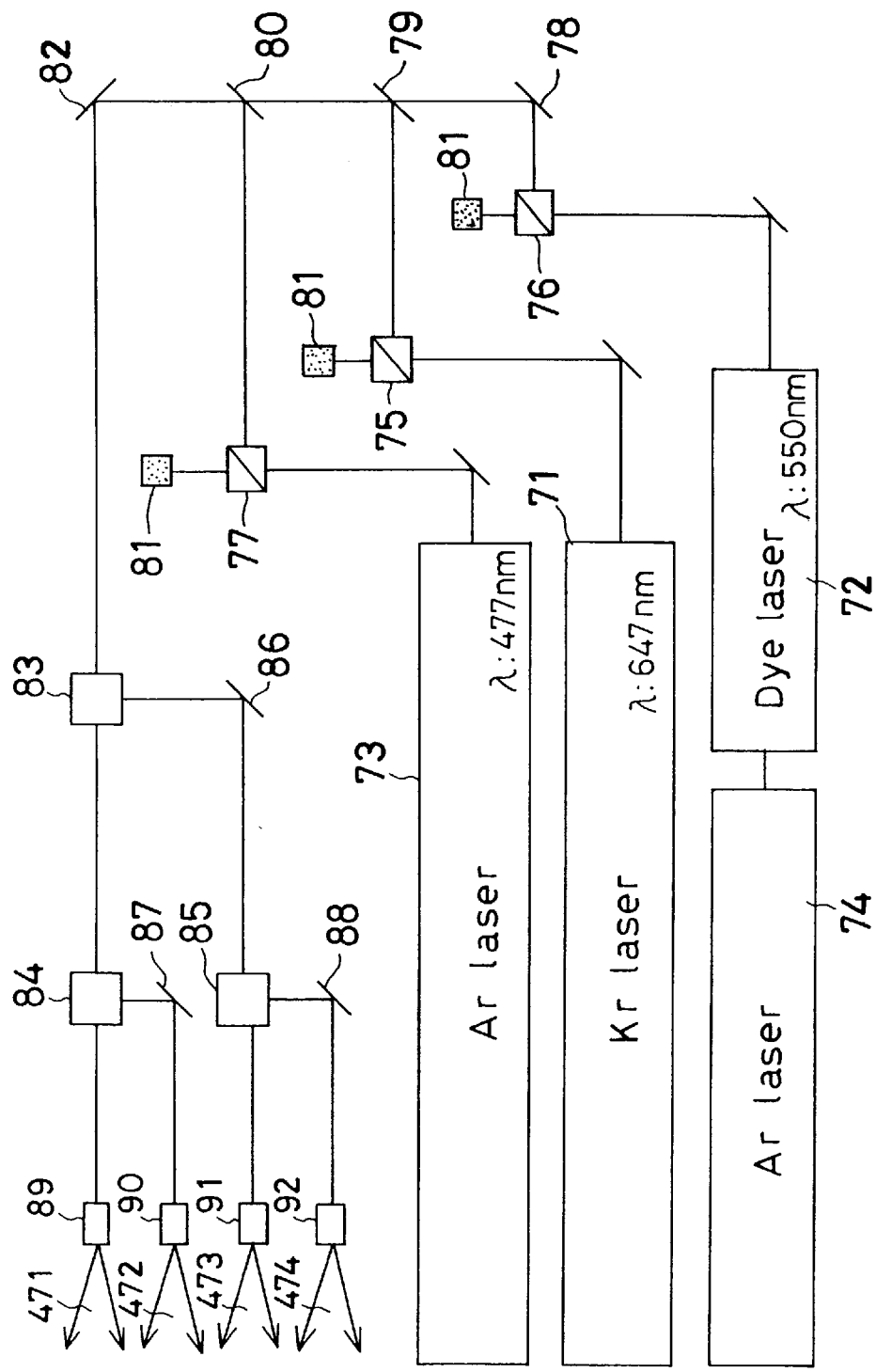
FIG. 19 is an optical path diagram showing one exemplary embodiment of the recording optical system used in the present invention.

More importantly, where multiple light containing two or three wavelengths emitted from such an optical system as referred to later with reference to FIG. 19 is used to illuminate the subject S for the recording of a wavelength multiplex multicolor Lippmann type hologram, a center wavelength thereof is usually shifted to a longer wavelength side especially when it is intended to widen the half bandwidth of diffracted wavelength by color tuning (to be described later) after hologram recording. In this case, the final color of the hologram is determined by the wavelength of the laser used for recording, the reflectance factor of the subject S, the sensitivity of the photosensitive material in which the hologram is to be recorded, and the shift and extent of wavelength due to color tuning. Thus, the reflectance factor of the subject S at each wavelength used for recording is determined from the color to be reproduced and these parameters.

It is here to be noted that the subject S may be positioned in parallel with, or at an angle with, the protective glass 22. Especially when illuminating light is not normal to the subject plate 5 during recording, a clearer hologram can be recorded if the subject plate 5 is inclined such that its front surface faces the illuminating light.

2) Mirror Subject (called a mirror subject plate)

A mirror subject plate, too, may be fabricated in the same manner as the aforesaid subject plate. When a plane mirror located as the subject S is parallel with the protective glass 22, incident light is reflected at the same angle as the incident angle in the opposite direction (a rear surface mirror plate).

When a plane mirror located as the subject S is not in parallel with the protective glass 22, incident light is reflected at an angle different from the incident angle in the opposite direction (a wedge mirror plate).

A variety of coaxial or off-axis spherical and aspherical mirrors (in ellipsoidal, paraboloidal, hyperboloidal, axi-symmetric surface and anamorphic surface forms) may be contained as the subject S in the mirror subject plate 5. By designing the mirror plate 5 by a suitable choice of the mirror to be contained as well as its position and angle, it is possible to record a hologram which is capable of producing any desired wave fronts and has any desired image distance and magnification.

To give a more colorful appearance to the mirror subject S, its surface may have been coated and colored with a dye or pigment-containing paint. When a wavelength multiplex multicolor Lippmann type hologram is finally subjected to color tuning as mentioned above, the reflectance factor of the subject S at each wavelength used for recording is again determined by the color to be reproduced, the sensitivity of the photosensitive material in which the hologram is to be recorded, and the shift and extent of wavelength due to color tuning.

How to record a Lippmann (Denisyuk) type hologram using such a hologram-recording subject plate 5 as shown in FIG. 1 will now be explained with reference to FIG. 1(*c*). Film 1 of photosensitive material is applied directly onto the side of the subject plate 5 on which the protective glass 22 is located. Upon the photosensitive film 1 irradiated with laser light 7, the subject S is illuminated with light 7 passing through the film 1. Then, light 8 scattered from the subject S (reflected light in the case where the subject S is a mirror), which behaves as object light, interferes in the film 1 with the laser light 7 (behaving as reference light) incident on the film 1 to produce interference fringes, which are in turn recorded in the film 1 in the form of a Lippmann type hologram. This is a method of recording a hologram using the hologram-recording substrate plate 5. With this method, which is the same as a conventional method of replicating hologram plates, it is possible to record a multiplicity of identical holograms in a continuous, easy yet stable manner. Even when the direction and wavelength of the laser light to define reference light are changed, it is possible to make a variety of holograms with respect to the same subject S in a easy yet stable manner.

A variety of members such as reflecting mirrors, scattering plates, colored plates, and patterned plates can be used instead of the glass substrate 21 of the subject plate 5, thereby recording aesthetically and artistically varied holograms. By using a relief type hologram with a three-dimensional object recorded in it instead of the glass substrate 21, it is also possible to fabricate a 3D image hologram having the three-dimensional object reconstructed from the relief type hologram and the subject S superposed one upon another.

When a multiplicity of holograms are continuously fabricated using a method similar to a conventional hologram-replicating method, it is required to provide solutions to problems associated with close attachment or detachment of the film 1 onto or from the plate 5, use of a contact liquid, and incorporation of dust in the interface at which the film 1 and plate 5 are brought in close contact with each other. These problems can be solved by the method and system already proposed by the applicant in Japanese Patent Application No. 6-171261, which will be explained in detail.

Figure 2A:
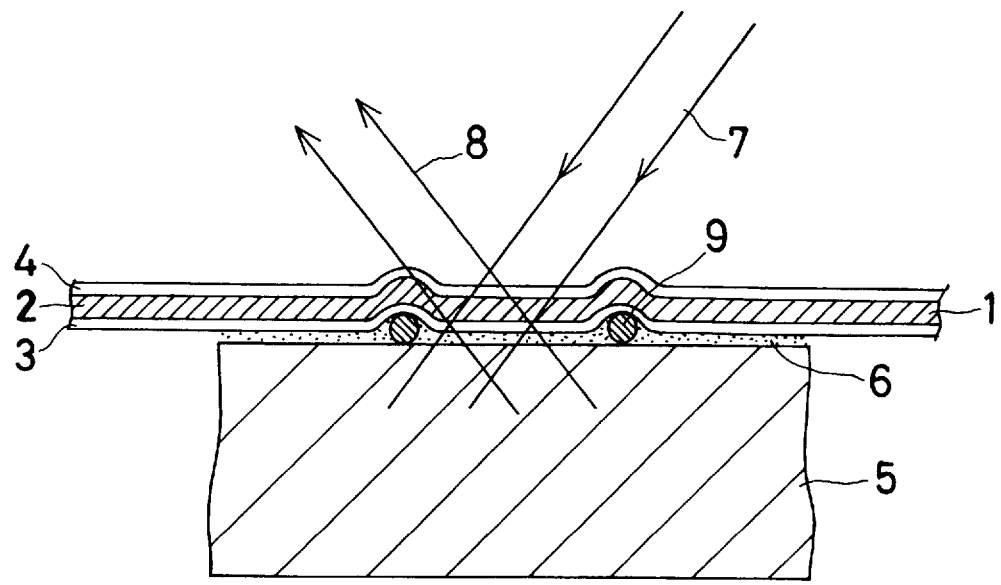
FIGS. 2(a)–2(b) present schematics for illustrating the hologram-making method according to the present invention.
Figure 2B:
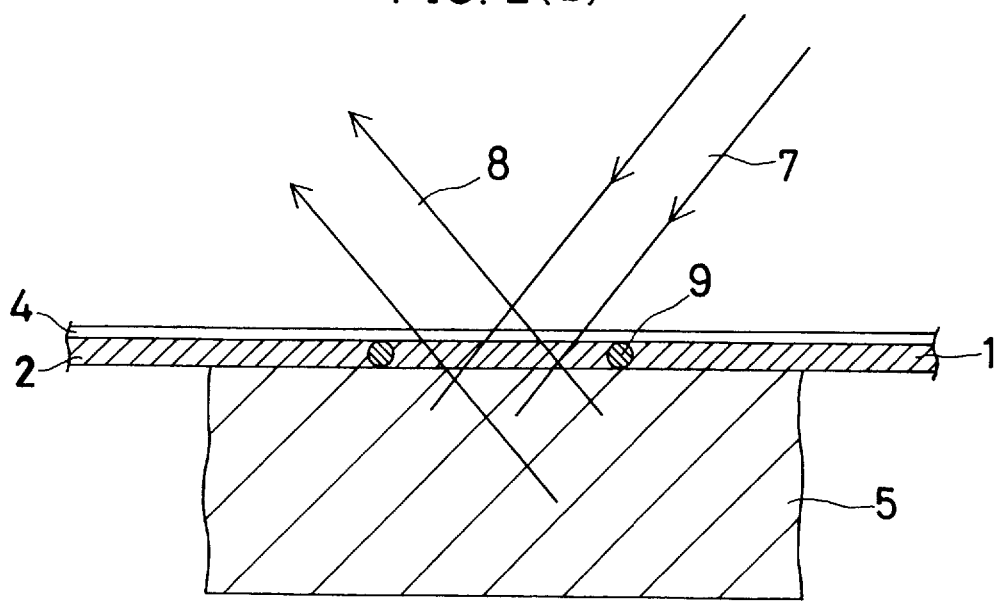

When a Lippmann type hologram is recorded using such a hologram-recording subject plate 5 as shown in FIG. 1, film 1 of photosensitive material is brought in close contact with a subject plate 5 with an optical contact liquid 6 contained between them, as illustrated in FIG. 2(*a*), said optical contact liquid having a refractive index approximately equal to that of the plate 5. Upon the incidence of laser light 7 on the film 1, the light 7 and light 8 scattered from the plate 5 are then allowed to interfere with each other in the film 1 brought in close contact with the plate 5. The hologram-recording film 1, which is made up of a photosensitive material such as photopolymer, has usually a three-layer structure comprising a support film layer 3, a photosensitive material layer 2 and a support film layer 4. With minute dust particles 9 inadvertently incorporated in the film 1 when it is brought in contact with the plate 5, recording defects occur because of the film 1 corrugation or a flow of the optical liquid 6 around the dust particles 9.

Such recording defects can be eliminated by releasing the support film layer 3 (not opposite to the plate 5) from the film 1 to expose the photosensitive material layer 2 (that is a viscoelastic member), and then applying the layer 2 directly onto the plate 5, as shown in FIG. 2(*b*), thereby embedding the dust particles 9 in the layer 2.

As a matter of course in this case, it is desired that dust particles, etc., present on the support film layers 3 and 4 be removed by gum rollers or the like. To avoid adsorption of dust particles, etc., due to static electricity generated incidental to the release of the support film layer 3, it is also desired that a static eliminator (ion-blowing or corona discharge equipment) be additionally used.

Figure 3A:
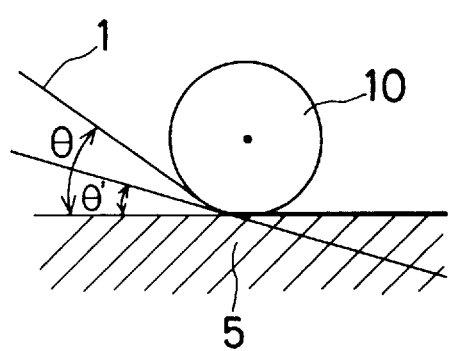
FIGS. 3(a)–3(b) present schematics for illustrating the film-laminating method based on the present invention.
Figure 3B:
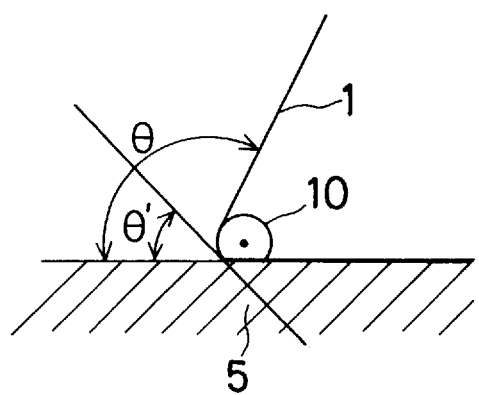

When the photosensitive material film 1 with one support film layer 3 removed from it is applied directly onto the plate 5, it is required that the film be brought in successive close contact with the plate 5 while the film 1 is squeezed from above, because captive air bubbles, etc., appear as immediate recording defects. Referring here to the diameter of a squeezing roller and a film traveling path, a system wherein, as shown in FIG. 3(*b*), a roller 10 is of small diameter and both an angle θ of the film 1 fed between the roller 10 and the plate 5 and an angle θ' of contact of the film 1 with the plate 5 are large is preferable to such a system as shown in FIG. 3(*a*). More exactly, the roller 10 should preferably have a diameter of up to 100 mm, more particularly about 50 mm. In this case, it is desired that another roller of large diameter be located on the roller 10 to apply pressure thereto, because the roller 10 often yields during operation. The angle θ of the film 1 fed between the roller 10 and the plate 5 is preferably at least 90°. It is also preferable that the roller 10 has a squeezing pressure as high as 0.1 kgf/cm² or more and the film 1 has a tension as high as 0.1 kgf/cm². In FIG. 3, the surface of contact of the roller 10 with the plate 5 is shown to be flat. This is because that surface is made flat by pressure applied to the roller 10.

Figure 4A:
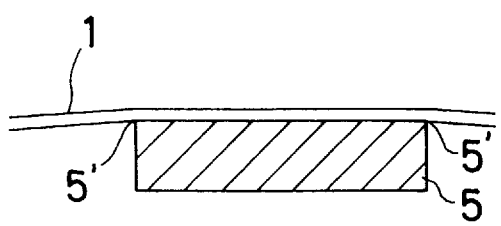
FIGS. 4(a)–4(b) provide illustrations of how a laminated film is injured by an end edge of the subject plate and an illustration of how to avoid this.

When the photosensitive material film 1 is brought in successive close contact with the plate 5 while it is squeezed by the roller 10 from above, thereby avoiding incorporation therein of air bubbles, etc., during the direct application of the photosensitive material film 1 with the support film layer 3 removed from it onto the plate 5, it is not preferable that the photosensitive material film 1 is brought in close contact with the plate 5 all over the surface, as shown in FIG. 4(*a*), because positions of the photosensitive material film 1 corresponding to end edges 5' of the plate 5 are injured by force concentrated thereon. For this reason, as can be seen from FIG. 4(*b*), the photosensitive film 1 is brought in close contact with only a central region of the plate 5 excluding the end edges 5' rather than with all over the surface thereof, while the film 1 is squeezed by the roller 10 from above. In this case, as shown in FIG. 4(*b*), portions of the film 1 which come in no contact with the plate 5 at both ends of the squeezing direction of the roller 10 are spaced up from the plate 5, and held at a small angle α with the surface thereof.

With the film 1 applied onto the plate 5 in this way, it is unlikely that air bubbles, etc., are incorporated in the film 1, and that positions of the film 1 corresponding to the end edges 5' of the plate 5 are injured. The aforesaid angle α is then found by $\alpha < \sin^{-1} (f/F)$ where F is the adhesion force of the photosensitive material layer 2 of the film 1 with respect to the plate 5 and f is the tension of the film 1. With the angle a preset within a range of 2° to 10°, it is usually unlikely that the film 1 is injured. Nor is the film 1 separated from the plate 5 during recording.

Figure 5:
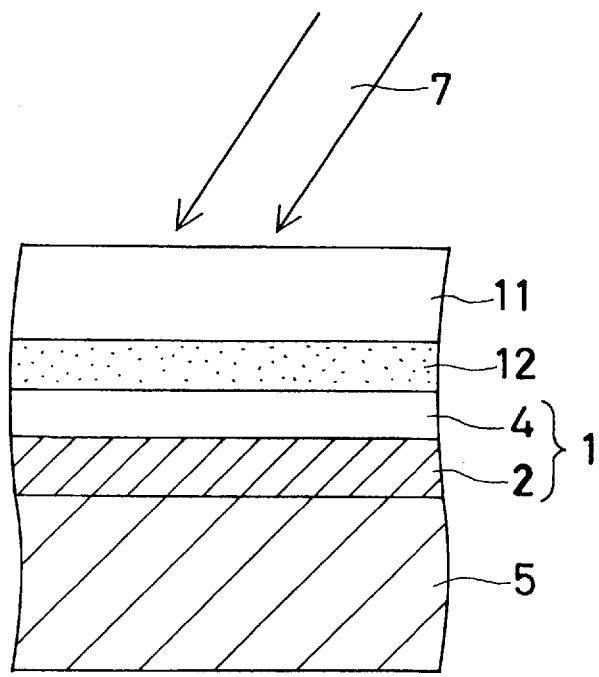
FIG. 5 is a view showing on exemplary layer structure used in making a hologram.

When the plate 5 is irradiated with the laser light 7 for recording, it is desired to use reflection-free coated glass or the like for the purpose of eliminating noises such as back reflection of incident light. In this case, it is preferable to use a layer structure comprising, in order from a side thereof on which laser light 7 is to be incident, a reflection-free coated glass 11, an optical contact liquid 12, a support film layer 4, a photosensitive material layer 2 and a subject plate 5, as shown in FIG. 5. For this support film layer 4 it is preferable to use light-absorbing film or reflection-free coated film.

Figure 6B:
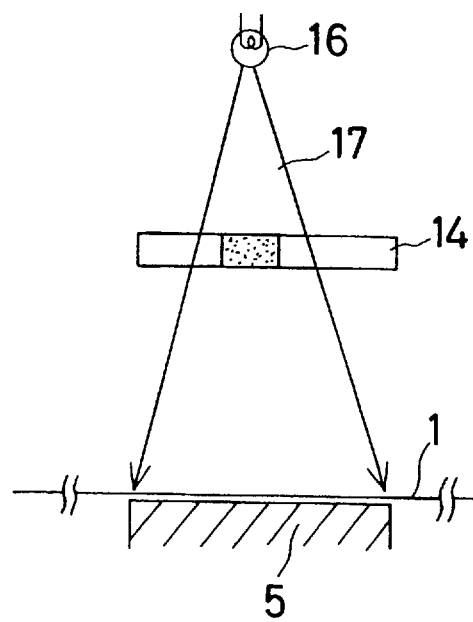
FIGS. 6(a)–6(b) present schematics for showing a trimming process used in making a hologram.
Figure 6A:
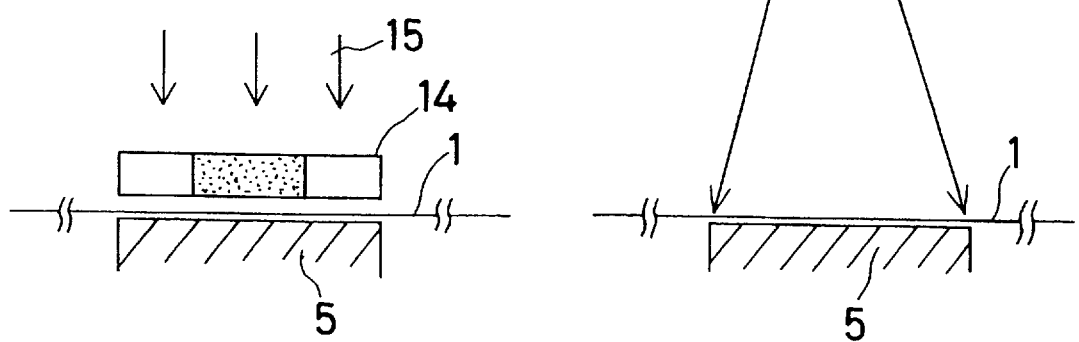

Prior to recording by the laser light 7, it is desired to use an additional ionizing radiation-masking device for trimming treatments wherein an area of the photosensitive material layer 2 not to be recorded on is irradiated with ultraviolet light or other ionizing radiation which sensitizes the photosensitive material layer 2, (thereby making exposure of that area to light sufficient and so allowing the sensitivity of that area to the laser light 7 to vanish). More specifically, this is achieved by contact exposure wherein, as shown in FIG. 6(*a*), film 1 of photosensitive material is exposed to ultraviolet light 15 while a trimming mask 14 is in close contact with the film 1, and projection exposure wherein, as shown in FIG. 6(*b*), divergent light is projected from an ultraviolet light source 16 toward film 1 of photosensitive material through a trimming mask 14 spaced away from the film 1. However, projection exposure is preferable to contact exposure because some space is available for the provision of the squeezing roller 10 (FIG. 3) and the reflection-free coated glass 11 (FIG. 5).

It is here to be noted that an ionizing radiation exposure irradiator must be provided to lower the adhesion of the recorded film 1 when it is released from the plate 5 upon the recording of the hologram by the laser light 7. For this irradiator use may be made of the ultraviolet light source 15 or 17 alone, i.e., the ionizing radiation-masking device used at the previous step from which the trimming mask 14 has been detached. It is also to be noted that the plate 5 itself has been previously coated with a fluorine or silicone type releasing agent on its surface with which the recording film 1 is to come in close contact.

The recorded film 1 may be released from the plate 5 if its one end is pulled up. In this case, however, the well recorded hologram often tends to have some defects because there is a longitudinal difference in the speed of release, which otherwise causes streaks or other release defects to occur along a release front at a position where a film release stops or becomes slow. Referring here to FIG. 7(*a*), as the recorded film 1 is pulled up at one end, the film release proceeds rapidly to a position shown at (1), where the film release stops temporarily. Then, the film release proceeds again rapidly to a position shown at (2). When such a discontinuous film release takes place, the recorded film 1 is marked with streaks at the positions (1) and (2). To avoid this, it is desired that the recorded film 1 be released from the plate 5 while it is kept by a roller 18 as in the case of squeezing (FIG. 3), as shown in FIG. 7(*b*). In this case, too, the roller 18 should preferably have a small diameter. In some cases, the squeezing roller 10 may be used instead of the releasing roller 18 on condition that it is rotated in the opposite direction.

In the recorded film 1 released from the plate 5 in this way, the photosensitive material layer 2 is exposed. To roll up the released film 1, it is required that a protective sheet be applied onto the photosensitive material layer 2 of the film 1. To achieve this, as shown in FIG. 7(b), a protective film 20 having an adhesive or self-adhesive layer on one side is fed out of a roller 19 that rotates in a direction opposite to that of the roller 18, so that the adhesive or self-adhesive side thereof can be applied onto the photosensitive material layer 2 of the released film 1. In some cases, the protective film 20 upon being applied onto the released film 1 should be treated by ionizing radiation emanating from an ionizing radiation irradiator to increase the adhesion force thereof. By increasing the releasability of the protective film 20, it is possible to use a seal type recording film 1.

To record the plate 5, a continuous form of film is usually used as the film 1. The continuous film is intermittently fed out by a length corresponding to the size of one frame plus a distance between adjoining frames, so that a plurality of periodic recording operations can be carried out. More specifically, as shown in FIG. 8, hologram-recording areas A, each being of size a as viewed in a longitudinal direction of the recording film 1, are periodically recorded on the film 1 at intervals b corresponding to inter-frame separations. When the plate 5 is recorded on the film 1 by such intermittent feeding, the film 1 is usually carried by some nip rolls (a pair of rolls) before and after exposure. The feeding of the film 1 is interrupted while the plate 5 is recorded thereon. In other words, while the rotation of the nip rollers is at a stop, the nip rollers continue to apply pressure to the film 1, resulting in the formation of a streak form of dent in the film 1. If this dent were made in a position of the film 1 corresponding to the hologram area A, it would remain in the form of a defect.

To avoid this, as shown in FIG. 9, all the positions of nip rollers R and R' before and after exposure are preset such that distances x and x' as measured from a center line of the original plate 5 along a film path satisfy the following relation:

$$n(a+b)+a/2 < x, \quad x' < n(a+b)+a/2+b$$

where n represents zero or a positive integer. In such a layout, a streak form of dent is made at a position between adjoining hologram areas A or adjoining frames, while the film 1 is at a stop for recording. Consequently, any adverse influence is not produced on hologram products obtained from the hologram areas A upon cut out. As a matter of course in this case, it is required that the aforesaid inter-frame separation b be larger than the nip width of the nip rollers R and R' (the width of a streak form of dent).

To remove noises such as back reflection of incident light, the reflection-free coated glass 11 is brought in close contact with the side of the film 1 on which the laser light 7 is to be incident, with the optical contact liquid (index-matching liquid) 12 contained between them, as shown in FIG. 5. When the index-matching liquid 12 moves forward while it is spread in a traveling direction of the film 1 and remains deposited on the film 1, it is transferred to carrying rollers formed of material such as NBR material or IIR rubbery material, because a standard solvent type of index-matching liquid such as that based on xylene, isoper or cargel is usually used as the index-matching liquid 12. This in turn causes changes in the geometry, size, and hardness of the rollers, which otherwise incur inconveniences such as nip trails, and so must be prevented. Furthermore in this case, it is required to prevent any possible migration of such an index-matching liquid 12 to the photosensitive material layer 2 of the film 1, because the photosensitive material layer 2 is again injured by such migration.

Figure 10A:
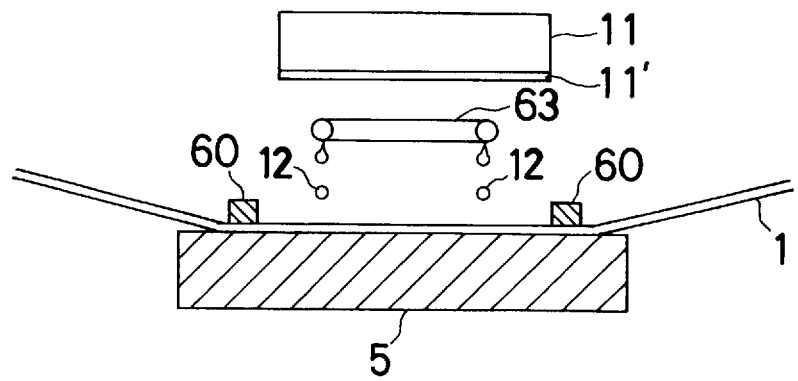
FIGS. 10(a)–10(b) present schematics for illustrating one exemplary construction for adding an index-matching liquid dropwise on film and one exemplary construction for preventing both the spreading of an index-matching liquid too far and the migration of the index-matching liquid to the back side the film.
Figure 10B:
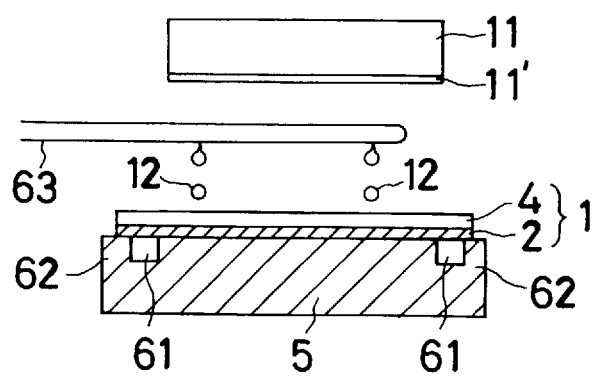
Figure 10C:
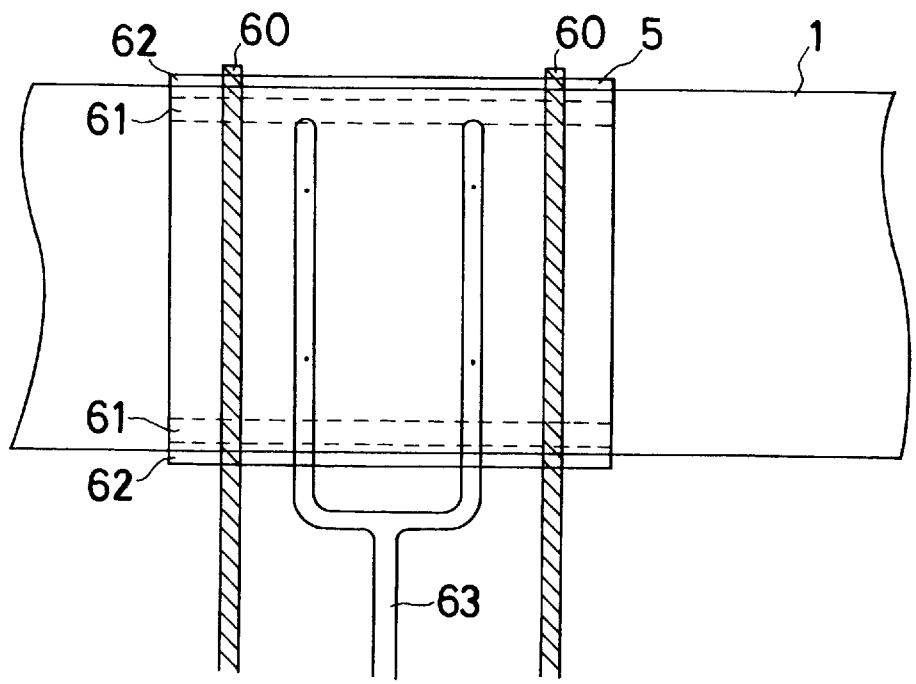

To prevent these, as shown in FIG. 10(a) that is a sectional view taken along a longitudinal direction of the film, FIG. 10(b) that is sectional view taken along a transverse direction of the film, and FIG. 10(c) that is a plan view, barrier members 60, which intercept the index-matching liquid 12 apt to spread in the traveling direction of the film 1, is first gently engaged with the film 1 which is in close contact with the plate 5 over all but an effective recording area and in the vicinity of both ends of the plate 5, before the reflection-free coated glass 11 is engaged with the film 11. To prevent any possible migration of the index-matching liquid 12 to the photosensitive material layer 2 of the film 1 to be in close contact with the plate 5, grooves 61 are formed in the surface of the plate 5 along both its sides extending along the longitudinal direction of the film, and banks 62 are so formed between both side edges of the plate 5 and the grooves 61 that both side edges of the film 1 are located on the banks 62. Thus, even when the index-matching liquid 12 added dropwise to the film 1 from the index-matching liquid feeder pipe 63 is apt to overflow and migrate to the photosensitive material 2 of the film 1, it is successfully intercepted by the banks 62. In case the index-matching liquid 12 should go over the banks 62, it will fall in the grooves 61. Thus, the migration of the index-matching liquid to the photosensitive material layer 2 is successfully avoidable, and so the photosensitive material layer 2 is not injured whatsoever.

Figure 4B:
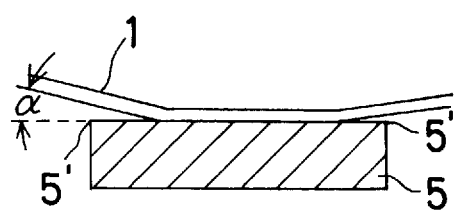

It is here to be understood that the barrier members 60 designed to intercept the index-matching liquid 12 apt to spread in the longitudinal direction of the film may be dispensed with, when portions of the film 1 other than the effective recording area are directed upward, as shown in FIG. 4(b).

To add the index-matching liquid 12 dropwise to the film 1 having function to prevent any possible spreading and migration of the index-matching liquid 12, it is preferable to use such an index-matching liquid feeder pipe 63 as best illustrated in FIG. 10(c), which is divided at its foremost end to at least two branches, each having a plurality of holes, so that the index-matching liquid 12 can be concurrently added dropwise to the film. Thus, the index-matching liquid 12 can be efficiently and uniformly added dropwise to the film within a short dropwise addition time.

If the film 1 were rolled immediately upon the reflection-free coated glass 11 removed from the film 1 with the plate 5 recorded thereon, the remnants of the index-matching liquid 12 would cause damage to the carrier rollers and so make the photosensitive material layer 2 have defects, as already mentioned. A product with deposits of the index-matching liquid 12, too, is not preferable. Furthermore, it is required to prevent any possible deposition of the index-matching liquid 12 onto the reflection-free coated glass 11 upon pulled up from the film 1, which may otherwise drop on the plate 5 or an undesired position of the film 1. To achieve this, a surface of the reflection-free coated glass 11 with which the film 1 is to be in close contact has been previously treated with a water repellency agent such as that based on fluorine or silicone.

Figure 11:
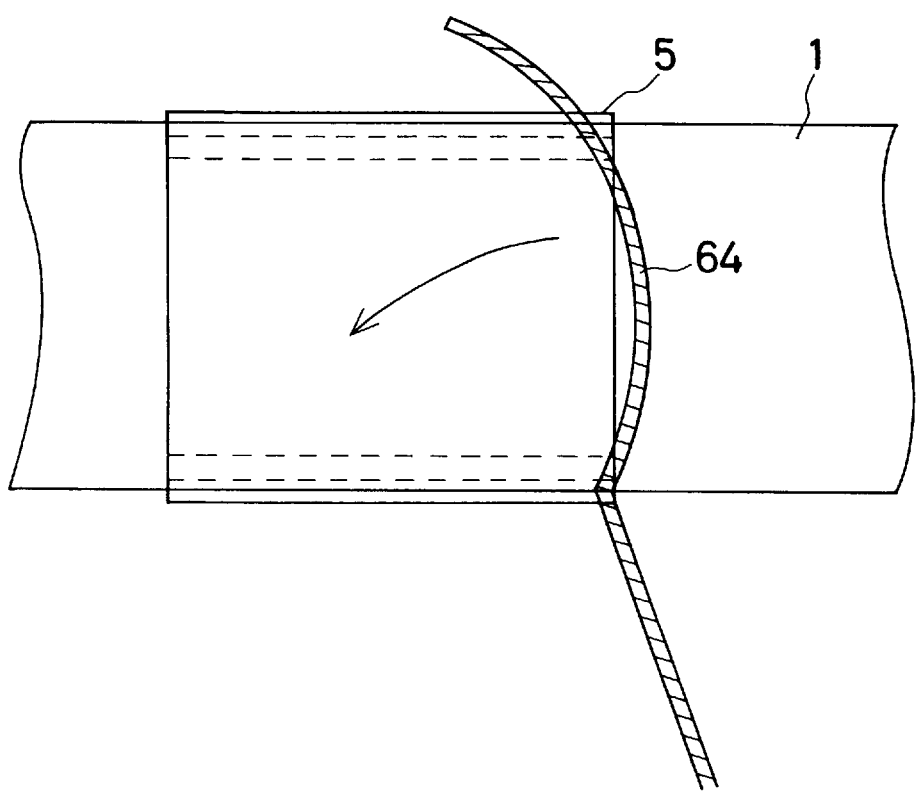
FIG. 11 is a schematic for one exemplary construction for wiping off an index-matching liquid.
Figure 13A:
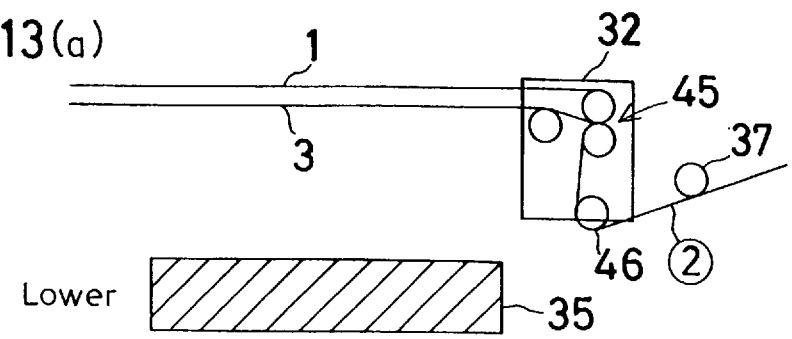
FIGS. 13(1)—13(4) present schematics for illustrating the steps of laminating and releasing a photosensitive material film onto and from the subject plate according to one embodiment of the present invention.
Figure 13B:
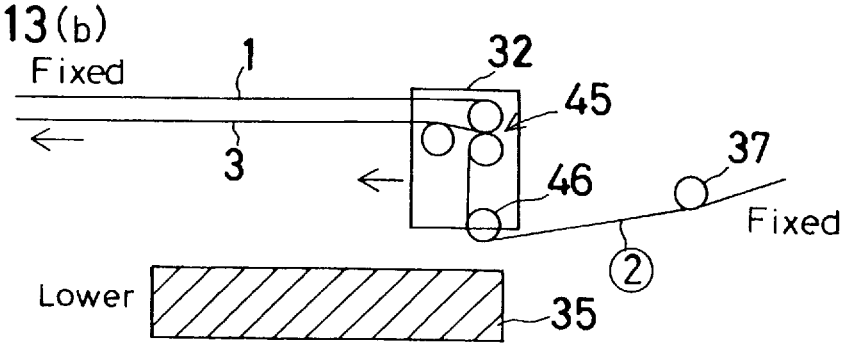
Figure 13C:
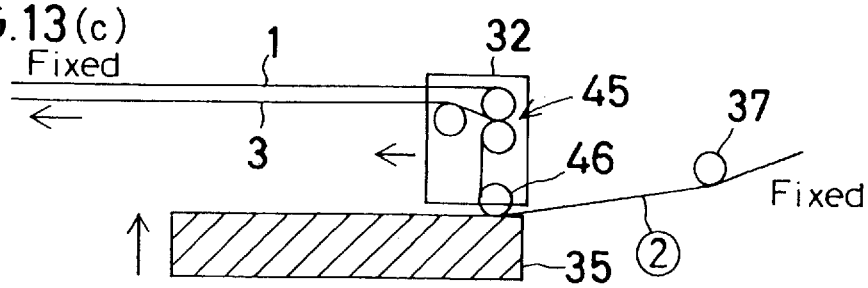
Figure 13D:
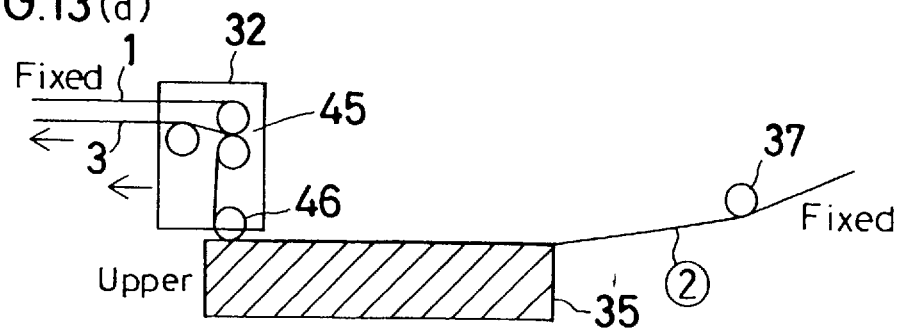
Figure 14A:
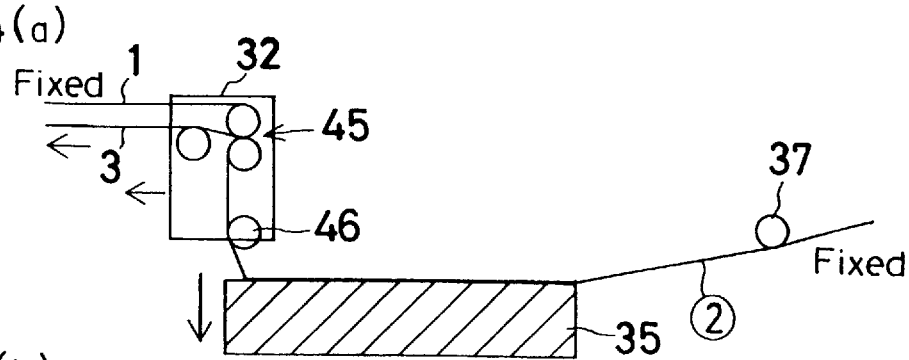
FIGS. 14(5)–14(9) present schematics for illustrating the steps to be carried out subsequent to the steps shown in FIG. 13.
Figure 14B:
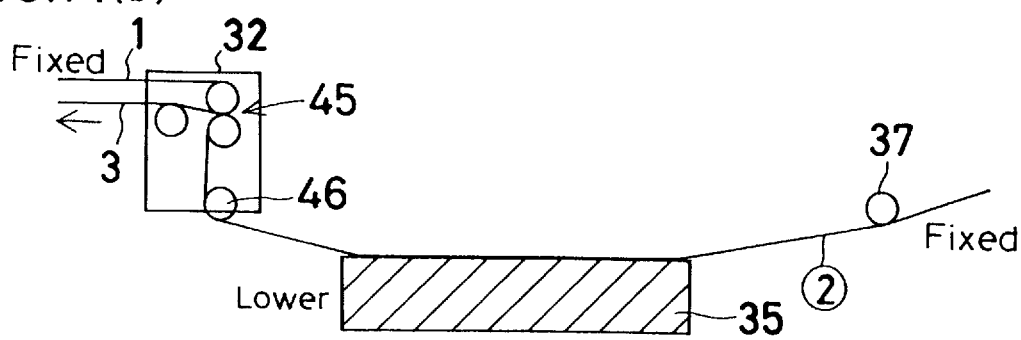
Figure 14D:
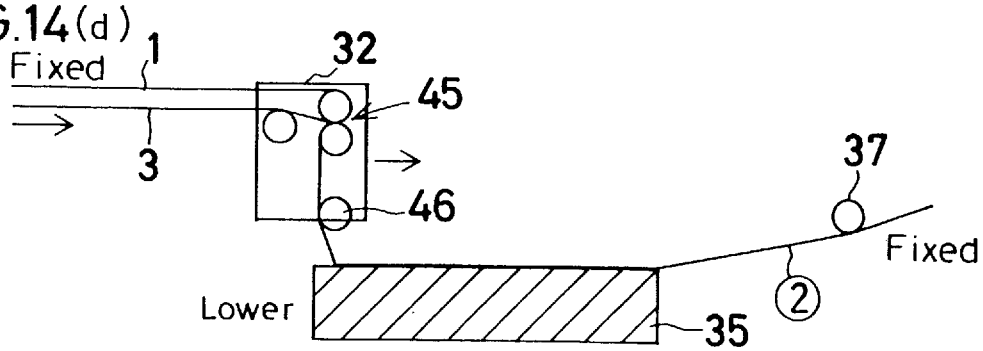
Figure 14E:
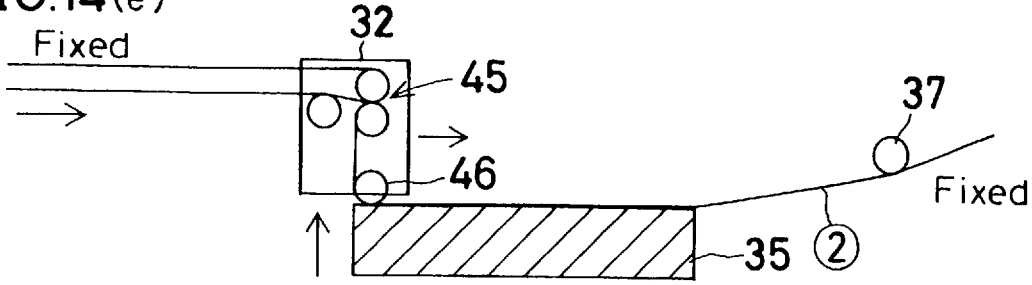

It is then desired that the remnants of the index-matching liquid 12 on the film 1 be wiped off by means of a squeegee (wiper) 64 which is extended in a concave or bow form in an arrow direction, as shown in FIG. 11. Alternatively, such remnants may be absorbed in sponge or scraped off by an air doctor. Traces of the index-matching liquid 12, if any, should preferably be dried.

One exemplary embodiment of the system for carrying out the aforesaid hologram-recording method will now be explained.

A subject plate 35 such as one shown in FIG. 1 is built in a hologram recorder system such as one shown in FIG. 12(a). In this recorder system, holographic recording film having a three-layer structure comprising a support film layer 3, a photosensitive material layer 2 and a support film layer 4, as shown sectionally in FIG. 12(b)-(1), and commercially available under the name of Omnidex-706 is used as recording film 1 of photosensitive material. Further, protective film comprising a 50-$\mu$m thick PET (polyethylene terephthalate) layer 51, a 1-$\mu$m thick optical adhesive layer (NOA-61 made by Norland Co., Ltd., USA) 52 and a 50-$\mu$m thick PET layer 53, as shown sectionally in FIG. 12(b)-(3), is used as protective film 50.

Referring to the construction and operation of this system, the recording film 1 is first unrolled out of an unwind roller 31 having the film 1 wound around it. Then, the unrolled film 1 is passed through a cleaning unit 44 wherein it is cleaned, and fed to a combined application and release head 32 where one support film layer 3 is released from the film 1. The thus released support film layer 3 is rolled around a take-up roller 33. On the other hand, the film 1 having the surface of the photosensitive material layer 2 exposed is laminated on a central area of the subject plate 35 by the movement of the application and release head 32 from the right to the left in the drawing as well as the upward or downward movement of the subject plate 35, as will be described later. At this time, the stop position of the application and release head 32, the upward or downward movement timing of the subject plate 35, and the position of a guide roller 37 are preset such that the recording film 1 is lifted up at an angle $\alpha$ (FIG. 4(b)) of about 2° to 10° at both ends of the subject plate 35.

Then, such barrier members 60 shown in FIG. 10 are transversely extended over the subject plate 35 with the film 1 laminated on it, and gently engaged with the film 1 in close contact with all but an effective recording area of the subject plate 35 (5) and in the vicinity of both ends thereof. Subsequently, an index-matching liquid feeder pipe 63 which, as shown typically in FIG. 10(c), is divided at the foremost end to at least two branches, each having a plurality of holes from which the index-matching liquid can be added dropwise onto the film 1 at the same time, is transversely extended over the subject plate 35, so that suitable amounts of the index-matching liquid or xylene can be added dropwise onto the film 1 applied onto the subject plate 35. Following this, the index-matching liquid feeder pipe 63 is withdrawn, and a reflection-free coated glass 34 (11) is placed over the film 1 while care is taken to prevent incorporation of bubbles therein. How to place the coated glass 34 over the film 1 will be described in more detail. It is here to be noted that the surface of the reflection-free coated glass 34 to be in close contact with the index-matching liquid has been treated with a water repellency agent such as that based on fluorine or silicone.

Thereafter, the whole is exposed to ultraviolet light 48 projected from an ultra-high pressure mercury lamp (not shown) through a chromium trimming mask 36, so that trimming (masking) can be done while only a central portion of the laminated area of the photosensitive material layer 2 is blocked off and other peripheral portions are exposed to the light 48 at an exposure of 30 mJ/cm², thereby making the photosensitivity thereof vanish.

The subject plate 35 is then irradiated from the side of the film 1 with Ar laser light 47 (at an irradiation dose of 30 mJ/cm²) to record the subject.

After the completion of the aforesaid exposure, the reflection-free coated glass 34 is released from the film 1. In the meantime, a squeegee (wiper) 64, which is extended in a concave (bow) form in an arrow direction along which wiping is to occur, as shown in FIG. 11, is inserted over the film 1 to wipe the film 1 while it is in gentle engagement with the film 1, thereby cleaning the index-matching liquid. The remnants of the index-matching liquid, if any, are dried in a heated air atmosphere.

Then, the recorded film 1 is released from the subject plate 35 by the movement of the application and release head 32 now from the left to the right in the drawing and the upward or downward movement of the subject plate 35, and the film 1 is fed out by a length equivalent to one frame plus an inter-frame separation. At this time, a protective film 50 having an adhesive layer 52 is laminated on the surface side of the photosensitive material layer 2, using laminating rollers 38. In this case, a cover sheet 51 (a PET sheet of 50 $\mu$m in thickness) of the protective film 50 unrolled out of an unwind roller 40 is released therefrom by release rollers 39, and is then rolled around a take-up roller 41.

The recorded film 1 with the protective film 50 applied onto it is introduced into an ultraviolet irradiator 42 for exposure to ultraviolet light coming from an ultra-high pressure mercury lamp at an exposure of 100 mJ/cm², and is then rolled around a take-up roller 43. It is here to be noted that to remove static electricity generated from the release rollers 45 and 39, static eliminators are located at their corresponding positions.

A distance x of the aforesaid nip rollers 45 and 38 as measured from a center line of the subject plate 35 along a traveling path of the film 1 is preset such that the following relation $$n(a+b)+a/2 < x < n(a+b)+a/2+b$$

is satisfied as in the case of FIG. 9. Here a is the size of an area on which a hologram is to be recorded in one recording operation, as viewed in the traveling direction of the film 1 (the size of one frame), b is the separation between adjoining hologram-recorded areas, as viewed in the traveling direction of the film 1, and n is zero or a positive integer. The positions of the nip rollers 45 and 38 are adjustable along the traveling path of the film 1 such that such relation can be satisfied.

At positions in such a system, as shown at (1) to (5) in FIG. 12(a), the recording film 1 of photosensitive material, the protective film 50, and the combined films 1 and 50 have such layer constructions as shown in FIG. 12(b). It is here to be noted that hologram seals can be obtained by releasing the cover sheet 53 from the final product cut in sheet forms. These hologram seals can be bonded to individual articles.

The operation of laminating and releasing the recording film 1 onto and from the subject plate 35 by the movement of the aforesaid application and release head 32 and the upward or downward movement of the subject plate 35 will now be explained in further detail with reference to FIGS. 13 to 15. The application and release head 32 is provided with release rollers 45 and a combined application and release roller 46. The recording film 1 of photosensitive material is fed between the release rollers 45 where it is separated into the support film layer 3 and a composite film layer comprising both the photosensitive material layer 2 and the support film layer 4, which will hereinafter be called the composite film layer (2). This composite film layer (2) is then guided to the guide roller 37 via the combined application and release roller 46. Between the combined application and release roller 46 and the guide roller 37 the composite film layer (2) is laminated onto the subject plate 35 for recording purposes, and then released from the subject plate 35. The application and release head 32 is provided with a mechanism for moving the head horizontally in the drawing, although not shown, and the subject plate 35 is mounted on a mechanism for moving the subject plate upwardly or downwardly, although not illustrated.

To laminate the composite film layer (2) onto the subject plate 35, as shown in FIG. 13(1), the plate 35 is first located at its lowermost position and the application and release head 32 is moved to a right-handed upper position that is in no alignment with the plate 35.

Then, while both the film 1 and the composite film layer (2) are fixed in place (both the unwind roller 31 and the take-up roller 43 are fixed in place), as shown in FIG. 13(2), the application and release head 32 is moved to the left until the combined application and release roller 46 is located just above the right end edge of the plate 35. In this case, the support film layer 3 is taken up at a speed twice as fast as that of movement of the application and release head 32.

Subsequently, the plate 35 is moved up and brought into engagement with the combined application and release roller 46, as shown in FIG. 13(2), while the combined application and release roller 46 remains located just above the right end edge of the plate 35. Then, while the combined application and release roller 46 remains engaged with the plate 35, the application and release head 32 is continuously moved to the left to initiate the lamination of the composite film layer (2) onto the plate 35.

The application and release head 32 continues to move to the left until just before the combined application and release roller 46 reaches the left end edge of the plate 35, as shown in FIG. 13(4), whereby the lamination of the composite film layer (2) onto the plate 35 is completed.

Thereafter, while the combined application and release roller 46 remains located just before the left end edge, the plate 35 is moved downward and spaced away from the combined application and release roller 46, as shown in FIG. 14(5).

Following this, the application and release head 32 is further moved to the left until it is located at a left-handed upper position that is in no alignment with the plate 35, as shown in FIG. 14(6), where the movement of the application and release head 32 is stopped. In this state, the composite film layer (2) is laminated onto only a central area of the plate 35 excluding both ends thereof rather than all over the surface of the plate 35, as shown in FIG. 4(b), so that the composite film layer (2) is lifted up from both ends of the plate 35 and held at a small angle a with the surface thereof. This angle a may lie between about 2° and about 10°, as already noted.

At a step shown at (7) in FIG. 14, the reflection-free coated glass 34 is placed over the composite film layer (2) with the index-matching liquid contained between them, after which trimming, exposure of the plate 35 to light, a release of the reflection-free coated glass 34, and cleaning and drying of the index-matching liquid are carried out.

Thereafter, the composite film layer (2) is released from the plate 35 by carrying out the aforesaid steps (1) to (6) in the reverse order. That is, the application and release head 32 is moved to the right until the combined application and release roller 46 is located just above the left end edge of the plate 35, as shown in FIG. 14(8). In this case, while both the film 1 and the composite film layer (2) remain fixed in place, the support film layer 3 is now fed out at a speed twice as fast as that of movement of the application and release head 32.

Then, as shown in FIG. 14(9), the plate 35 is moved up and brought into engagement with the combined application and release roller 46. While the combined application and release roller 46 remains in engagement with the plate 35, the application and release head 32 continues to move to the right, thereby starting a release of the composite film layer (2) from the plate 35.

Figure 15A:
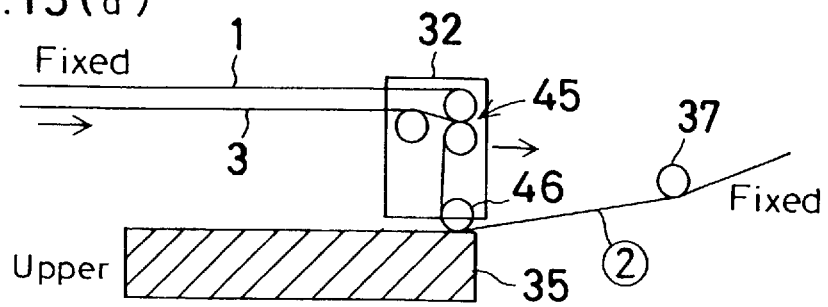
FIGS. 15(10)–15(12) present schematics for illustrating the remaining steps to be carried out subsequent to the steps shown in FIG. 14.
Figure 15B:
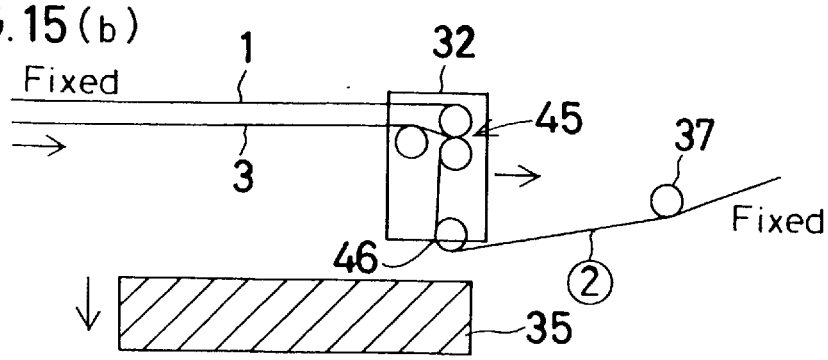
Figure 15C:
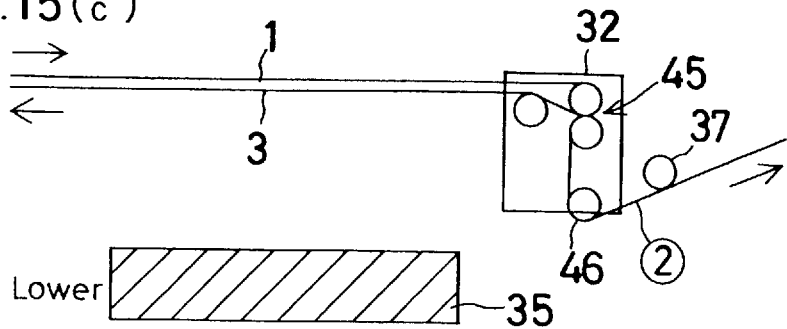

As shown in FIG. 15(10), the application and release head 32 is moved to the right until just before the combined application and release roller 46 reaches the right end edge of the plate 35, whereby the release of the composite film layer (2) from the plate 35 is completed.

Then, as shown in FIG. 15(11), while the combined application and release roller 46 remains located just before the right end edge of the plate 35, the plate 35 is moved down and spaced away from the combined application and release roller 46.

Finally, as shown in FIG. 15(12), the application and release head 32 is further moved to a right-handed upper position that is in no alignment with the plate 35, where the movement of the application and release head 32 is stopped. In this state, the film 1 is fed out of the unwind roller 31 by a length corresponding to the size of one frame plus an inter-frame separation ((a+b) in FIG. 8), and both the support film layer 3 and the composite film layer (2) are rolled around the take-up rollers 33 and 34 by the same length.

Then, the step of FIG. 13(1) is resumed for the next recording.

The steps of laminating and releasing the film 1 of photosensitive material onto and from the subject plate 35 have been explained. In what follows, how to place the reflection-free coated glass 34 over the index-matching liquid added dropwise to the film 1 applied onto the plate 35, while care is taken to prevent incorporation of bubbles therein, will be explained in further detail with reference to FIGS. 16 and 17.

Figure 16A:
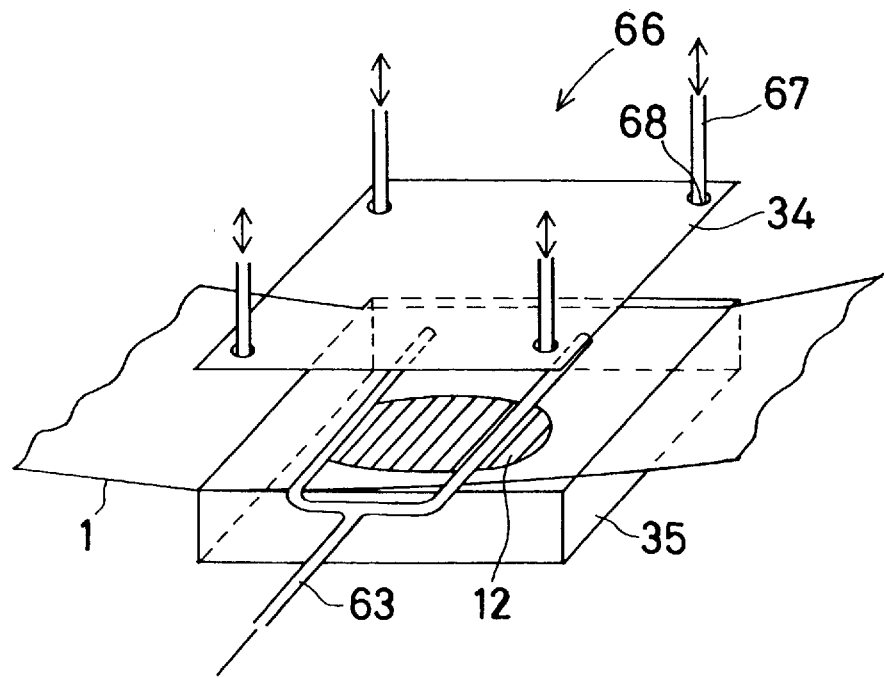
FIGS. 16(1)–16(2) present schematics for illustrating a part of the steps of placing a reflection-free coated glass over a laminated photosensitive material film.
Figure 16B:
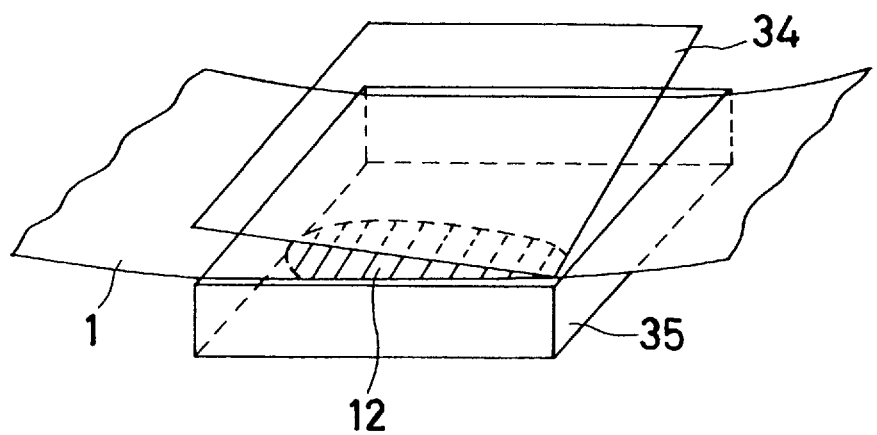

As shown in FIG. 16(1), the reflection-free coated glass 34 is provided with a mechanism 66 for moving the glass 34 vertically. In a specific embodiment shown in this drawing, the reflection-free coated glass 34 is provided through four corners thereof with rods 67 in operable association with universal joints 68, which are independently movable vertically by means of air cylinders. While the recording film 1 of photosensitive material (the composite film layer (2) shown in FIG. 12(b)) is laminated onto the plate 35, the mechanism 66 for moving the reflection-free coated glass vertically is spaced apart from an upper surface of the plate 35. Upon the completion of the lamination of the film 1 onto the plate 35, the mechanism 66 is moved near the upper surface of the plate 35 so that the reflection-free coated glass 34 is held at a certain height from the plate 35. Between the plate 35 and the reflection-free coated glass 34 an index-matching liquid feeder pipe 63 is transversely extended so that a suitable amount of the index-matching liquid 12 can be added dropwise to the surface of the film 1 applied onto the plate 35. Following this, the index-matching liquid feeder pipe 63 is withdrawn.

Then, as shown in FIG. 16(2), the mechanism 66 for moving the reflection-free coated glass vertically is so actuated that the reflection-free coated glass 34 is first slowly lowered such that only one corner of the reflection-free coated glass 34 comes in contact with the laminated film 1. At this position, the index-matching liquid has already been added dropwise to the surface thereof. The reason for the operation is that if the reflection-free coated glass 34 was lowered at one time, air bubbles would be incorporated in the index-matching liquid 12, thus resulting in recording defects.

Figure 17A:
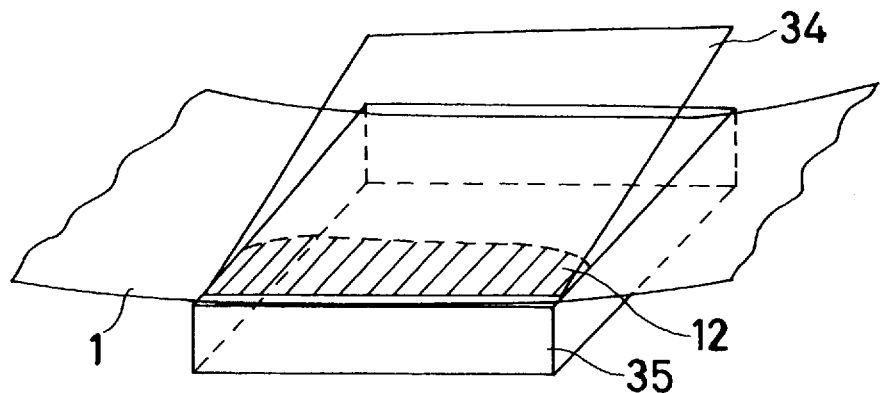
FIGS. 17(3)—17(5) present schematics of another part of the steps shown in FIG. 16.
Figure 17B:
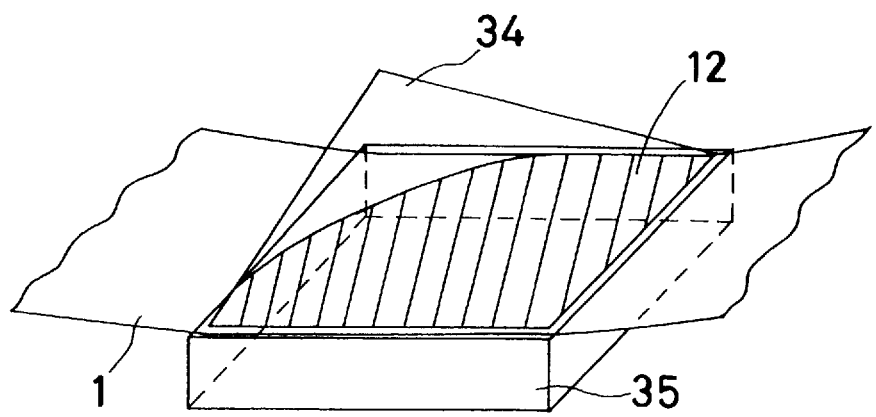
Figure 17C:
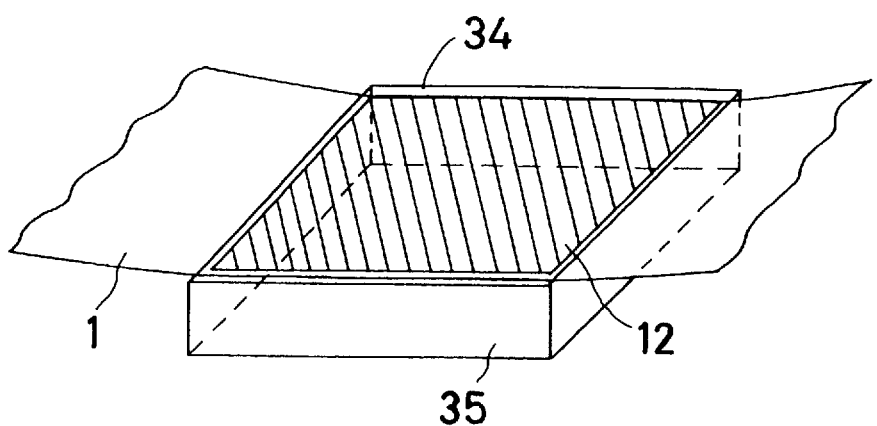

Subsequently, as shown in FIG. 17(3), another corner of the reflection-free coated glass 34 which is adjacent to the first-mentioned corner is slowly lowered so that a side defined by both corners comes in contact with the film 1.

Following this, as shown in FIG. 17(4), one of the remaining two corners in no contact with the film 1 is slowly lowered for contact with the film 1, so that the index-matching liquid 12 is spread in a widthwise direction of the film 1. At this time, the reflection-free coated glass 34 yields three-dimensionally; however, the amount of yielding is within tolerance limits acceptable in view of the elasticity of the reflection-free coated glass 34 and its support frame, and so is acceptably small. Referring typically to a reflection-free coated glass of 300 mm×400 mm×5 mm in dimensions, the amount of yielding is about 1 mm to about 2 mm.

Finally, as shown in FIG. 17(5), the last one corner is brought in contact with the film 1, thereby completing an air bubble-free, recording laminate comprising the plate, photosensitive material film, index-matching liquid and reflection-free coated glass in the described order.

With the hologram recorder system having such construction as described above, it is possible to provide a continuous yet efficient fabrication of holograms which are free of recording defects due to foreign matters such as dust and air bubbles, and release trails as well.

To obtain a hologram from the subject plate 35 by means of multi-recording techniques using three laser light beams, it is to be understood that, according to the layout shown in FIG. 12, laser light beams 47 of different wavelengths may be successively directed to the film 1 of the plate 35 during recording, or alternatively the plate 35 may be concurrently irradiated with light beams of different wavelengths during recording.

The layout shown in FIG. 12 is a specific embodiment wherein the subject plate 35 contains a subject presenting one scene and the hologram areas A (FIG. 8) are formed on the photosensitive material film 1 for each frame. In another specific embodiment of the present invention, the subject plate 35 contains a plurality of juxtaposed subjects S1 to S4, as can be seen from FIG. 18, which are then recorded on as many frames (hologram areas A) in one recording operation. In this case, a laser beam large-enough in section to cover all of the subjects S1 to S4 may be used as laser light 47 for illuminating the plate 35. Since difficulty is involved in uniform exposure of each hologram area A because such a laser beam has a strong central light intensity, however, it is desired that to illuminate the hologram areas A, as many laser light beams 471 to 474 be separately used.

FIG. 19 is an optical path diagram illustrating one embodiment of an illumination optical system designed to make a full-color Lippmann hologram comprising a mixture of the three primary colors by multi-recording techniques using a plurality of such illuminating laser light beams 471 to 474, each defined by multiple light emanating from a three-wavelength laser. More specifically, a Kr laser 71 (647 nm) is used as a red light source; a dye laser 72 (550 nm) having an Ar laser 74 in the form of an excitation laser is used as a green light source; and an Ar laser 73 (477 nm) is used as a blue light source. To converge laser light beams from these lasers into a single optical path via corresponding variable beam splitters 75 to 77, a total reflection mirror 78 and dichroic mirrors 79 and 80 are used. In the layout shown, the dichroic mirror 79 is a red narrow-band mirror having a reflection-free coating on its back surface while the dichroic mirror 80 is a transmitting mirror which has a reflection-free coating on its back surface and selectively transmits only light of wavelength 500 nm or longer. It is here to be understood that the layout of the lasers 71 to 73 is not always limited to that shown, and so any desired modification may be possible. In this case, however, it is required to alter the locations and reflection bands of the total reflection mirror 78, and the dichroic mirrors 79 and 80. It is here to be noted that reference numeral 81 represents shielding plates designed to absorb unnecessary light components split by the variable beam splitters 75 to 77, thereby preventing any occurrence of stray light.

The light converged by the dichroic mirrors 79 and 80 into a single optical path is reflected at the total reflection mirror 83, and then split by a beam splitter 82 into two beams, which are each in turn split by beam splitters 84 and 85 into two beams. In this way, four light beams in all define the aforesaid laser light beams 471 to 474 which illuminate areas of the subjects S1 to S4 through spatial filters 89 to 92. It is here to be noted that total reflection mirrors 86 to 88 are provided to guide the split light to predetermined positions.

Figure 20:
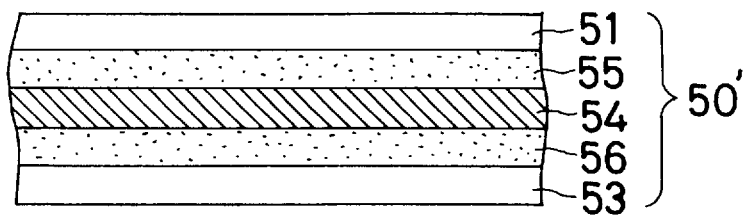
FIG. 20 is a sectional view showing another exemplary layer construction of the protective film.
Figure 21:
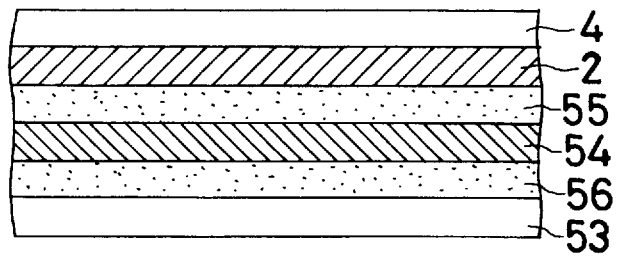
FIG. 21 is a sectional view showing one exemplary layer construction of the hologram-recording film having the protective film of FIG. 20 laminated thereon.

Referring back to FIG. 12, the photosensitive material layer 2 of the recorded film 1 upon release from the plate 35 is protected by applying thereto the adhesive layer 52 of the protective film 50, with a section thereof shown at (3) in FIG. 12(b), which is exposed by removal of the cover sheet 51. In this way, the photosensitive material layer 2 of the film 1 is protected by the PET cover sheet 53. Upon this cover sheet 53 released from the layer 2 of the final product, it can be bonded to a desired article as a hologram seal. Instead of this protective film, it is also possible to use a protective film 50' having such a layer structure as shown sectionally in FIG. 20. In other words, a five-layer film is used in place of such a three-layer film as shown at (3) in FIG. 12(b). In FIG. 20, reference numerals 51 and 53 represent cover sheets formed as of PET, as in the case of FIG. 12(b), between which a black sheet 54 formed as of PET is sandwiched along with adhesive layers 55 and 56. Such a protective film 50', upon the cover sheet 51 released from it by the release roller 39, is applied by means of the laminating roller 38 to the photosensitive material layer 2 of the recorded film 1 upon released from the plate 35. At a position shown at (5) in FIG. 12(a) in this case, there is obtained the hologram-recorded film 1 to which the protective film 50' having such a section as shown in FIG. 21 is applied. This film 1 is then rolled around the take-up roller 43 upon exposure to ultraviolet light from the ultraviolet irradiator 42.

Thus, when the black sheet 54 is located below the hologram layer 2, the background of the hologram becomes dark, so that when the hologram is used as a seal or the like, the recorded image can be seen clearly or displayed noticeably. When a colored transparent or opaque sheet or a patterned sheet (e.g., a screen tone) is used in place of the black sheet 54, aesthetically enhanced effects are obtainable. Even when the adhesive layer 52 itself is blackened or otherwise colored instead of using this intermediate sheet, similar effects are more or less obtainable. Preferably, the intermediate sheet or the colored adhesive layer 52 should be of some transparency because the resultant image is of considerable profundity; so it can be seen more three-dimensionally than would heretofore been possible.

Figure 22:
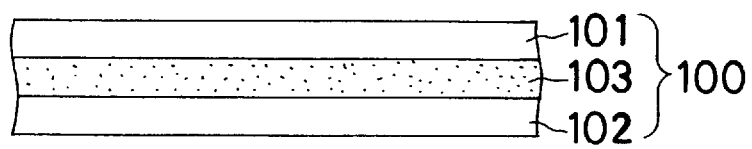
FIG. 22 is a sectional view showing one exemplary layer construction of a protective sheet used in place of the support film layer.

When the recorded film 1 is post-treated by irradiation with ultraviolet light emanating from the ultraviolet irradiator 42, the adhesion force of the support film layer 4 to the photosensitive material layer 2 decreases. As a result, the support film layer 4 becomes likely to detach itself from the photosensitive material layer 2 in a state shown at (5) in FIG. 12(b) or in FIG. 21. Such a likelihood is not preferable, for instance, when the recorded film 1 is used in the form of the end product, e.g., as a transfer seal as will be described later. In this case, it is desired to release the support film layer 4 from the photosensitive material layer 2 and, instead, apply a separately provided protective sheet thereto. FIG. 22 is a sectional view of such a protective sheet shown at 100, which comprises a protective sheet member 101, an adhesive layer 103, and a cover sheet member 102. For use, the cover sheet member 102 is removed from the protective sheet 10 to expose the adhesive layer 102, which is then applied onto the surface of the photosensitive material layer 2 of the film 1 from which the support film layer 4 is released, so that the protective sheet member 101 can be applied thereto. If required, the film 1 may be thermally treated upon the protective sheet member 101 applied thereto. In this case, it is preferable to use a variety of colored sheets or patterned sheets in place of a transparent sheet because aesthetically enhanced effects are obtainable. To make protective function much higher, it is preferable to use a sheet of hard coat material.

Figure 23:
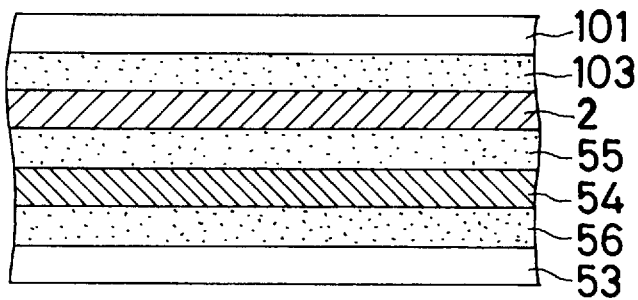
FIG. 23 is a view showing one exemplary layer construction of the hologram-recording film protected with the protective film of FIG. 20 and the protective sheet of FIG. 22.
Figure 24:
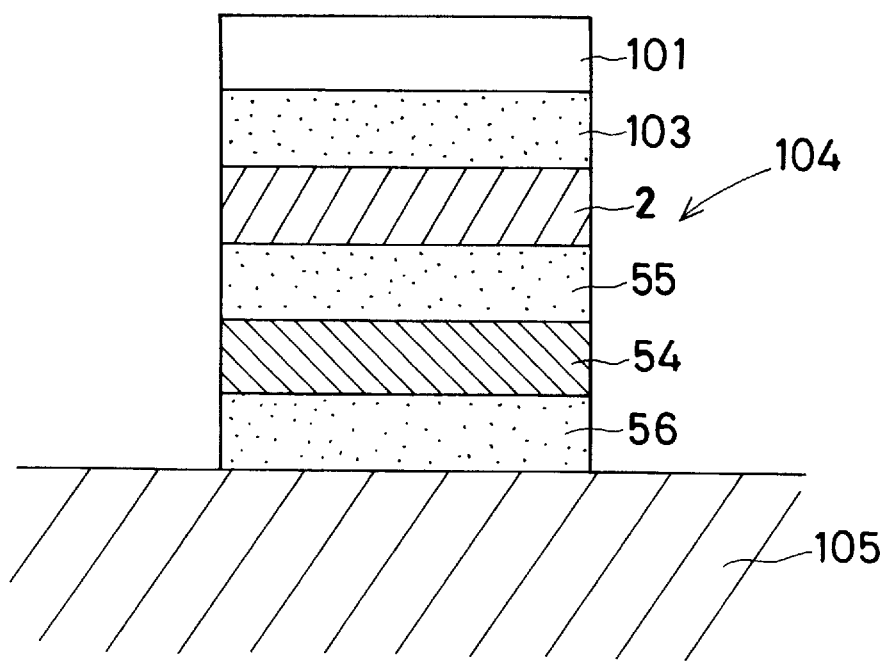
FIG. 24 is an illustration of how a transfer seal having the layer construction shown in FIG. 23 is applied onto a substrate.

FIG. 23 is a view of one embodiment of the general layer construction of the hologram-recorded film 1 wherein the photosensitive material layer 2 is protected on the lower side with the protective film 50' shown in FIG. 20 and on the upper side (from which the support film layer 44 has already been removed) with the protective sheet 101 shown in FIG. 22. Such a hologram-recorded film 1, if cut into suitable size, may be used as a transfer sheet. FIG. 24 illustrates a transfer seal 104 having the layer construction shown in FIG. 23, which is applied onto a surface of an application substrate 105 such as a book, pamphlet or card. As illustrated, the cover sheet 53 is released from the seal 104 to expose the adhesive layer 56, which is then bonded to a surface of the substrate 105 such as a book, pamphlet or card.

A main intention of the aforesaid hologram-making method is to obtain a transfer seal or other end product by causing the laser light 7 (47) to interfere in the photosensitive material layer 2 with the scattered light 8 from the plate 5 (35) to record a reflection type of Lippmann hologram therein. However, such a hologram has a narrow diffracted wavelength property. Another intention of the present invention is, therefore, to apply a color tuning technique to a hologram with interference fringes recorded therein to widen the half bandwidth of diffracted wavelength, thereby increasing the luminance brightness of the hologram.

Color tuning is a technique according to which a photosensitive material layer 2 such as a photopolymer, with a hologram recorded therein, is heated while a color tuning film is in close contact therewith to disperse monomers, plasticizers or the like in the photosensitive material layer 2, thereby widening the bandwidth of diffracted wavelength (see JP-A-3-46687). When a Lippmann type hologram upon subjected to color tuning is illuminated with white light, there is an increase in the quantity and, hence, luminance brightness of the diffracted light because of an increase in the half bandwidth of diffracted wavelength.

According to the present invention, a color tuning film substantially similar in layer structure to, and as an alternative to, the protective film 50 of FIG. 12 is applied onto the photosensitive material layer 2. In this case, it is the layer 52 which provides a color tuning layer in place of the adhesive layer. Alternatively, a laminate with a color tuning film laminated on an exposed surface of the adhesive layer 52, shown in section at (4) in FIG. 12, may be applied onto the photosensitive material layer 2. A heater is then disposed on an upstream side of the ultraviolet irradiator 42. Prior to the application of the color tuning film, the photosensitive material layer 2 may have been irradiated with ultraviolet light to reduce disorders in interference fringes, which occur incidental to the color tuning of the photosensitive material layer 2 by exposure to ultraviolet light. By such structural modification, it is possible to widen the half bandwidth of diffracted wavelength of the hologram recorded in the photosensitive material layer 2, thereby making the hologram bright. As can be seen from a specific embodiment to be described later, however, color tuning causes a center diffracted wavelength to be usually shifted to a longer (or possibly shorter) wavelength side. Unless, in the fabrication of the subject plate 5, care is taken to compensate for this wavelength shift to select the wavelength of recording laser and color the subject S, a desired color reproducibility is not attainable at all. This is of vital importance especially when fabricating a full-color Lippmann type hologram comprising a mixture of the three primary colors. For this reason, it is preferable to use, for each primary color, paint of a color having a center wavelength enough to compensate for any possible wavelength shift at the center wavelength of each primary color and a laser corresponding to that wavelength.

Reference will now be made to one exemplary embodiment of a hologram fabricated using such a system as shown in FIG. 12 and modified as mentioned just above for color tuning.

Figure 25:
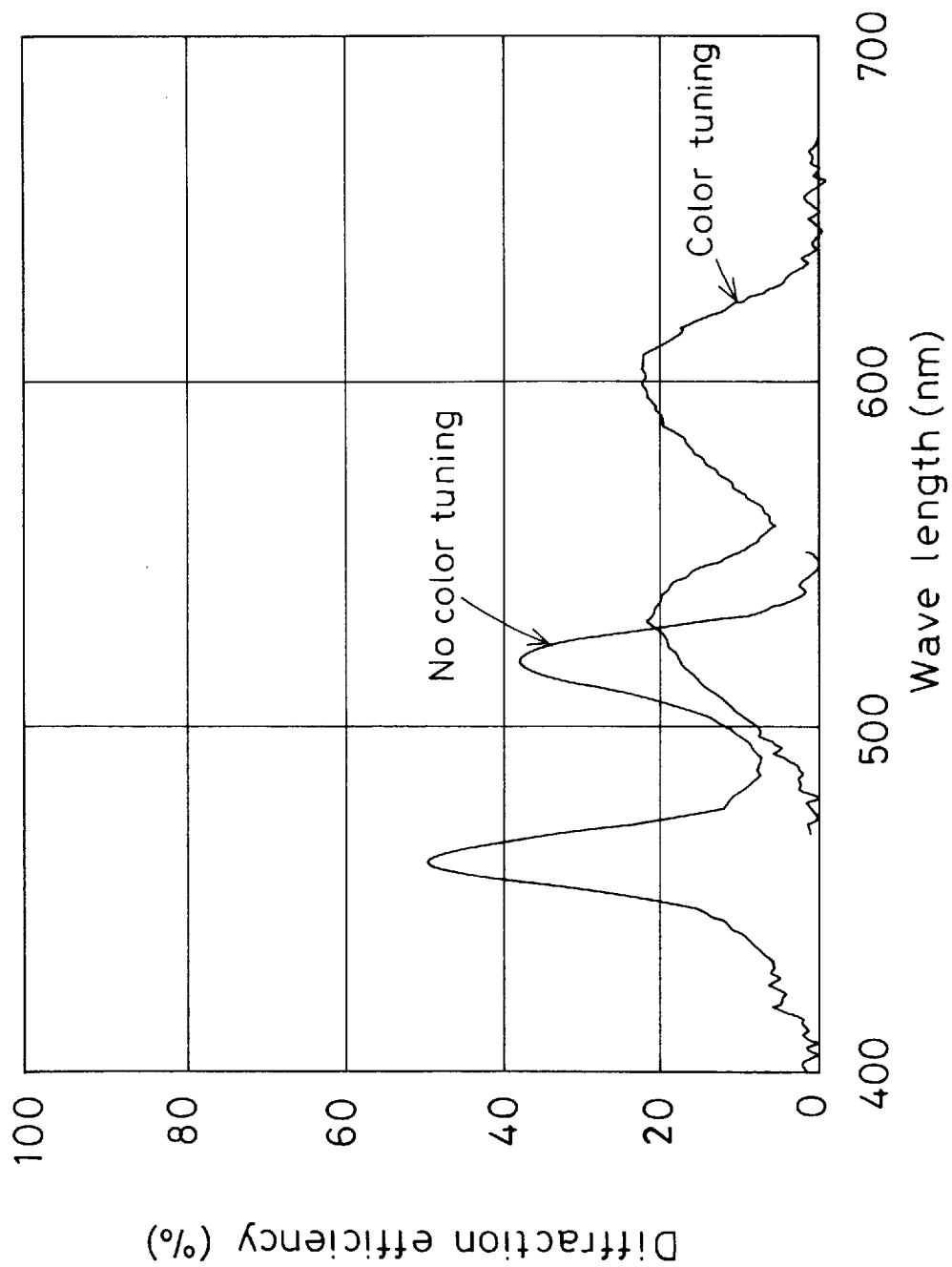
FIG. 25 is a wavelength vs. diffraction efficiency graph regarding a portion corresponding to a region coated with blue paint according to one embodiment of the present invention when it has, and has not, been subjected to color tuning.

A patterned aluminum plate was subjected to nickel plating, and further colored with blue paint (enamel paint made by Tamiya Mokei K. K., Clear Blue X-23) and green paint (enamel paint made by Tamiya Mokei K. K., Clear Green X-25). The thus colored aluminum plate was contained together with a silicone type of transparent filler in a box made up of glass plates, thereby fabricating a hologram-recording subject plate. Provided apart from this was a hologram photosensitive material (Omnidex 706 made by Du Pont and having a photosensitive material layer of 20 $\mu$m in thickness) having a PVC film on one side and a PET film on the other side. While an exposed side of the photosensitive material with the PVC film removed from it was not opposite to the subject plate and the other side of the photosensitive material was squeezed by rollers, it was applied onto the subject plate. The whole was then concurrently illuminated from the hologram photosensitive material with laser light of wavelengths 458 nm and 514 nm to thereby record a hologram thereon. Subsequently, while the applied hologram photosensitive material was kept by rollers, it was released at its leading end from the subject plate. Following this, a color tuning film (GA2RED made by Du Pont and having a thickness of 20 $\mu$m) for shifting the reconstructed wavelength to a longer wavelength side and widening a half bandwidth thereof was applied to an exposed surface of the photosensitive material, and then thermally treated at 140° C. for 15 minutes, thereby obtaining a hologram having a center reconstructed wavelength shifted to a longer wavelength side by about 80 nm, thereby presenting yellowish green and orange, and a half bandwidth of diffraction efficiency widened by 20 nm to 30 nm, i.e., a half bandwidth of 40 nm to 50 nm. Brightness in this case (a diffraction efficiency peak area) was about 1.5 times as high as that would be achievable with no color tuning. This hologram is characterized by the color of the laser selected for recording rather than the color of the paint coated onto the subject. FIG. 25 shows wavelengths vs. diffraction efficiencies of a portion corresponding to the region coated with the blue paint when subjected to color tuning and not.

So far, it has not been considered to subject a wavelength multiplex Lippmann type hologram to color tuning, as contemplated in the present invention, thereby widening the bandwidth of diffracted wavelength. Therefore, three methods for discriminating a hologram subjected to color tuning from a hologram not subjected will here be briefly explained.

The first method is applicable to the case wherein a color tuning film laminated on a hologram-recorded layer remains. In this case, whether the hologram has been subjected to color tuning or not can be easily discriminated.

The second and third methods are applicable to the case where no color tuning film is found on a hologram-recorded layer. In the second method, whether or not as-measured diffraction efficiency spectra are fit for Kogelnik's theoretical formula for a dielectric lattice having no loss ("The Bell System Technical Journal", 48(9), 1969, pp. 2909–2947, esp., p. 2932) is determined. If they are fit for that theoretical formula, it is found that the hologram has been subjected to no color tuning.

In the third method, a hologram is observed in section under an electron microscope. The hologram is found to have been subjected to color tuning when the pitch becomes successively wide or narrow.

The hologram-making method and hologram-recorded article according to the present invention have been explained with reference to some specific embodiments; however, the present invention is in no sense limited thereto, and so a variety of changes and modifications may be possible.

As can be appreciated from the foregoing explanations, the present invention provides a hologram-recording subject plate comprising a transparent solid block containing a hologram-recording subject. With this subject plate, it is possible to record a multiplicity of identical holograms in an easy, stable yet continuous manner. To achieve this, only a photosensitive material film is applied directly onto one surface of the subject plate to irradiate the subject plate through the photosensitive material film with laser light. Even when the direction and wavelength of laser light are changed, it is possible to record a variety of holograms with respect to the same subject. By providing the back surface of the subject plate with a reflecting mirror, scattering plate, colored plate or patterned plate as one integral piece, it is possible to record aesthetically and artistically varied holograms, and by providing the back surface of the subject plate integrally with a hologram with a three-dimensional object recorded on it, it is possible to make a hologram producing three-dimensionally superposed 3D images. Furthermore, by using a plane or curved mirror as the subject to be contained in the transparent block, it is possible to record a hologram capable of reconstructing any desired wave fronts or a hologram having any desired image distance or magnification.

With the hologram-making method according to the present invention, it is possible to record a multiplicity of identical holograms in an easy, stable yet continuous manner, because recording can be carried out by bringing a photosensitive material film in close contact with a hologram-recording subject plate and irradiating the subject plate with light through the photosensitive material film. One support film is released from the photosensitive material film, the photosensitive material film is successively applied at its exposed surface onto the subject plate while it is squeezed by rollers, and, upon exposure to light, the photosensitive material film is released at its leading end from the subject plate while it is retained by rollers; so it is possible to make a hologram which is free from air bubbles incorporated therein, and defects upon release and so is of good quality.

The hologram-recorded article according to the present invention is aesthetically very variable, and so may be used as a transfer seal or the like.

What we claim is:

1. A hologram-making method wherein a photosensitive material film, which is in close contact with a subject plate for recording a hologram, is irradiated with light to record the hologram therein, said photosensitive material film being comprised of a photosensitive material having support film layers located on both sides thereof, said method comprising the steps of:

releasing one support film layer from said photosensitive material film with a combined application/release head moving in a first direction while said photosensitive material film is fed in a feeding direction, successively applying said photosensitive material film onto said subject plate with said combined application/release head with the thus exposed side of said photosensitive material film located not opposite to said subject plate, while the other side of said photosensitive material film opposite to said subject plate is squeezed by a roller of said combined application/release head against said subject plate, irradiating said photosensitive material film with light while said photosensitive film and said combined application/release head are stationary, successively releasing a leading end of said photosensitive material film from said subject plate with said combined application/release head moving in a direction opposite to the first direction while said photosensitive material film is retained by said roller, and rolling said photosensitive material film.

2. The hologram-making method according to claim 1, further comprising the step of successively applying an adhesive protective film onto an exposed surface of the released photosensitive material film.

3. A hologram-making method wherein a photosensitive material film, which is in close contact with a subject plate for recording a hologram, is irradiated with light to record the hologram therein, said photosensitive material film being comprised of a photosensitive material having support film layers located on both sides thereof, said method comprising the steps of:

releasing one support film layer from said photosensitive material film with a combined application/release head moving in a first direction while said photosensitive material film is fed in a feeding direction, successively applying said photosensitive material film onto said subject plate with said combined application/release head with the thus exposed side of said photosensitive material film located not opposite to said subject plate, while the other side of said photosensitive material film opposite to said subject plate is squeezed by a roller of said combined application/release head against said subject plate, irradiating said photosensitive material film with light while said photosensitive film and said combined application/release head are stationary, successively releasing a leading end of said photosensitive material film from said subject plate with said combined application/release head moving in a direction opposite to the first direction while said photosensitive material film is retained by said roller, successively applying a color tuning film onto an exposed surface of the thus released photosensitive material film, thereby widening a bandwidth of diffracted wavelength, and rolling said photosensitive material film.

4. The hologram-making method according to claim 1 or 3, wherein said subject plate for recording a hologram comprises a transparent solid block, in which a subject for recording a hologram is contained.

5. The hologram-making method according to claim 4, wherein said solid block is integrally provided on a front surface thereof with a transparent protective body, and said subject is integrally provided on a back surface thereof with a colorless transparent body, a colored transparent body or a black absorption body.

6. The hologram-making method according to claim 4, wherein said solid block is integrally provided on a front surface thereof with a transparent protective body, and said subject is integrally provided on a back surface thereof with one of a reflecting mirror, a scattering plate, a colored plate or a patterned plate, or a combination of two or more thereof.

7. The hologram-making method according to claim 4, wherein said solid block is integrally provided on a front surface thereof with a transparent protective body, and said subject is integrally provided on a back surface thereof with a hologram.

8. The hologram-making method according to any one of claims 4 to 7, wherein said subject comprises a plane mirror or a curved mirror.

9. The hologram-making method according to claim 1 or 3, wherein the light for irradiating said photosensitive material film comprises a plurality of light of different wavelengths.

10. The hologram-making method according to claim 1 or 3, wherein said subject plate has peripheral edges substantially perpendicular to said feeding direction of said photosensitive material film, and in said applying step, said photosensitive material film is applied to said subject plate such that a portion of said photosensitive material film is spaced away from said edges.

11. The hologram-making method according to claim 10, wherein in said applying step, said portion of said photosensitive material film spaced away from said edges makes an angle of between 2° and 10° with a surface of said subject plate.

12. The hologram-making method according to claim 1 or 3, further comprising the step of desensitizing an area of said photosensitive material film not to have a hologram recorded thereon, said desensitizing step being performed prior to said irradiating step.

13. The hologram-making method according to claim 1 or 3, further comprising the steps of applying an index-matching liquid to said photosensitive material film after said photosensitive material film has been applied to said subject plate, and subsequently bringing a sheet of reflection-free coated glass in close contact with said photosensitive material film.

14. The hologram-making method according to claim 1 or 3, wherein said hologram is a volume-phase type hologram.

\* \* \* \* \*